(12) United States Patent
Konyndyk et al.

(10) Patent No.: US 11,740,077 B2
(45) Date of Patent: Aug. 29, 2023

(54) METHOD AND APPARATUS FOR REMOTE OPTICAL MEASUREMENT OF THE POSITION OF A SURFACE

(71) Applicant: THE BOEING COMPANY, Arlington, VA (US)

(72) Inventors: David M. Konyndyk, Arlington, VA (US); Mark Douglas Fuller, Snohomish, WA (US); Jerry A. James, Seattle, WA (US); Timothy P. Huang, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/102,694

(22) Filed: Jan. 28, 2023

(65) Prior Publication Data

US 2023/0184545 A1    Jun. 15, 2023

Related U.S. Application Data

(62) Division of application No. 16/246,867, filed on Jan. 14, 2019, now Pat. No. 11,585,653.

(51) Int. Cl.
| | | |
|---|---|---|
| *G01B 11/26* | (2006.01) | |
| *B64F 5/60* | (2017.01) | |
| *G01B 11/00* | (2006.01) | |
| *G01B 11/02* | (2006.01) | |
| *G06K 7/10* | (2006.01) | |

(Continued)

(52) U.S. Cl.
CPC .............. *G01B 11/26* (2013.01); *B64F 5/60* (2017.01); *G01B 11/002* (2013.01); *G01B 11/026* (2013.01); *G06K 7/10237* (2013.01); *G07C 5/008* (2013.01); *G07C 5/0808* (2013.01)

(58) Field of Classification Search
CPC . B64F 5/10; B64F 5/60; G01B 11/002; G01B 11/026; G01B 11/26; G01B 11/00; G01B 11/0691; B64C 1/26; B64C 13/40; B64C 13/42; E04C 3/11; E04C 3/40; E04C 2003/0452; E04C 3/02; E04C 2003/026;

(Continued)

(56) References Cited

U.S. PATENT DOCUMENTS

| | | |
|---|---|---|
| 7,372,558 B2 | 5/2008 | Kaufman et al. |
| 7,887,191 B2 | 2/2011 | Dill et al. |

(Continued)

*Primary Examiner* — Masum Billah
(74) *Attorney, Agent, or Firm* — Ostranger Chong Flaherty & Broitman P.C.

(57) ABSTRACT

Systems and methods for optically measuring a position of a measurement surface relative to a reference position. The system is a wireless network comprising a centrally located data acquisition computer and a multiplicity of remotely located sensor modules mounted at different locations within wireless communication range of a central receiver. Each sensor module is mounted to a clamp that is made specific to a control surface location and embedded with an RFID tag to denote clamp location. The optical components of the sensor modules are selected to enable indication of the linear position of a measurement surface relative to a reference position and then broadcast the measurement results. The broadcast results are received by the central receiver and processed by the data acquisition computer, which hosts human interface software that displays measurement data.

20 Claims, 33 Drawing Sheets

(51) Int. Cl.
*G07C 5/00* (2006.01)
*G07C 5/08* (2006.01)

(58) Field of Classification Search
CPC ..... E04C 2003/0413; E04C 2003/0434; E04C 2003/0491; E04C 3/08; E04C 2003/0473
USPC .......................................................... 114/39
See application file for complete search history.

(56) References Cited

U.S. PATENT DOCUMENTS

| | | |
|---|---|---|
| 7,986,417 B2 | 7/2011 | Rueb et al. |
| 9,410,793 B2 | 8/2016 | Kaufman et al. |
| 2004/0189944 A1 | 9/2004 | Kaufman et al. |
| 2005/0052657 A1 | 3/2005 | Braghiroli |
| 2014/0368637 A1* | 12/2014 | Yeeles .................... G01C 21/04 |
| | | 348/135 |
| 2015/0178412 A1 | 6/2015 | Grau |
| 2018/0251236 A1* | 9/2018 | Monleón de la Lluvia Jordá ...... |
| | | G01B 11/27 |

* cited by examiner

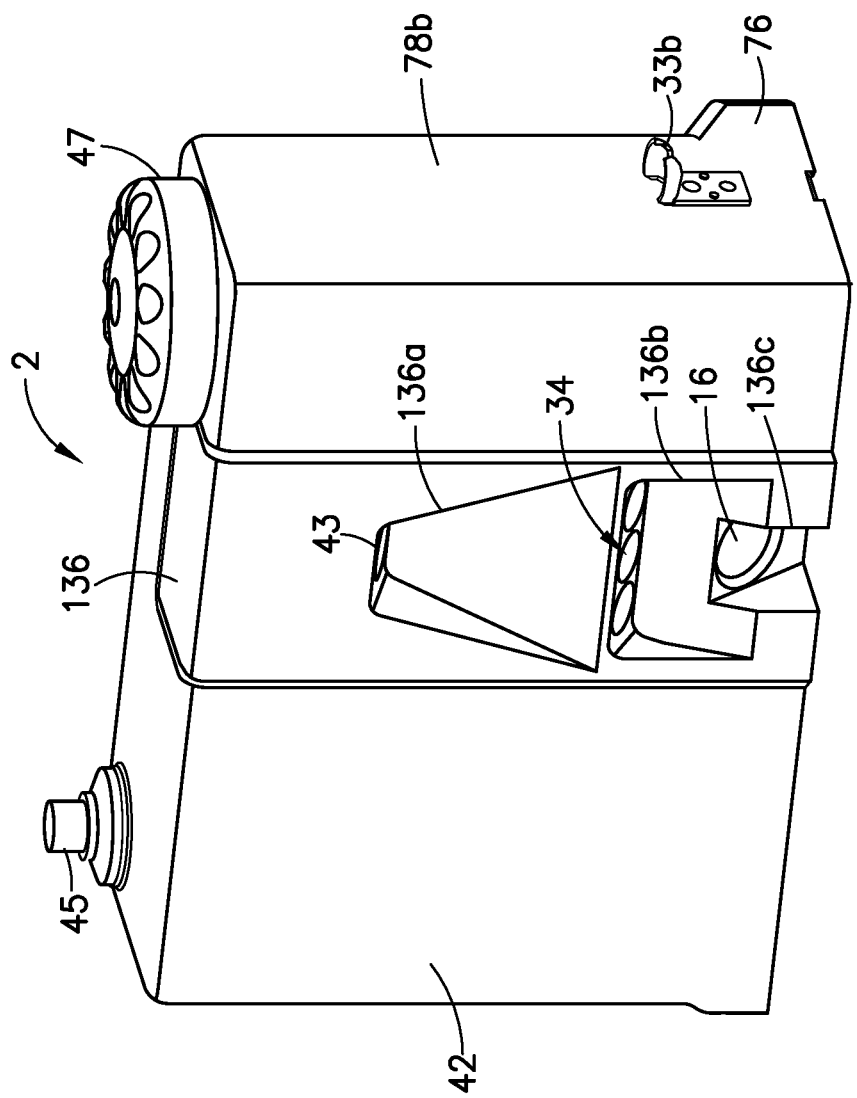

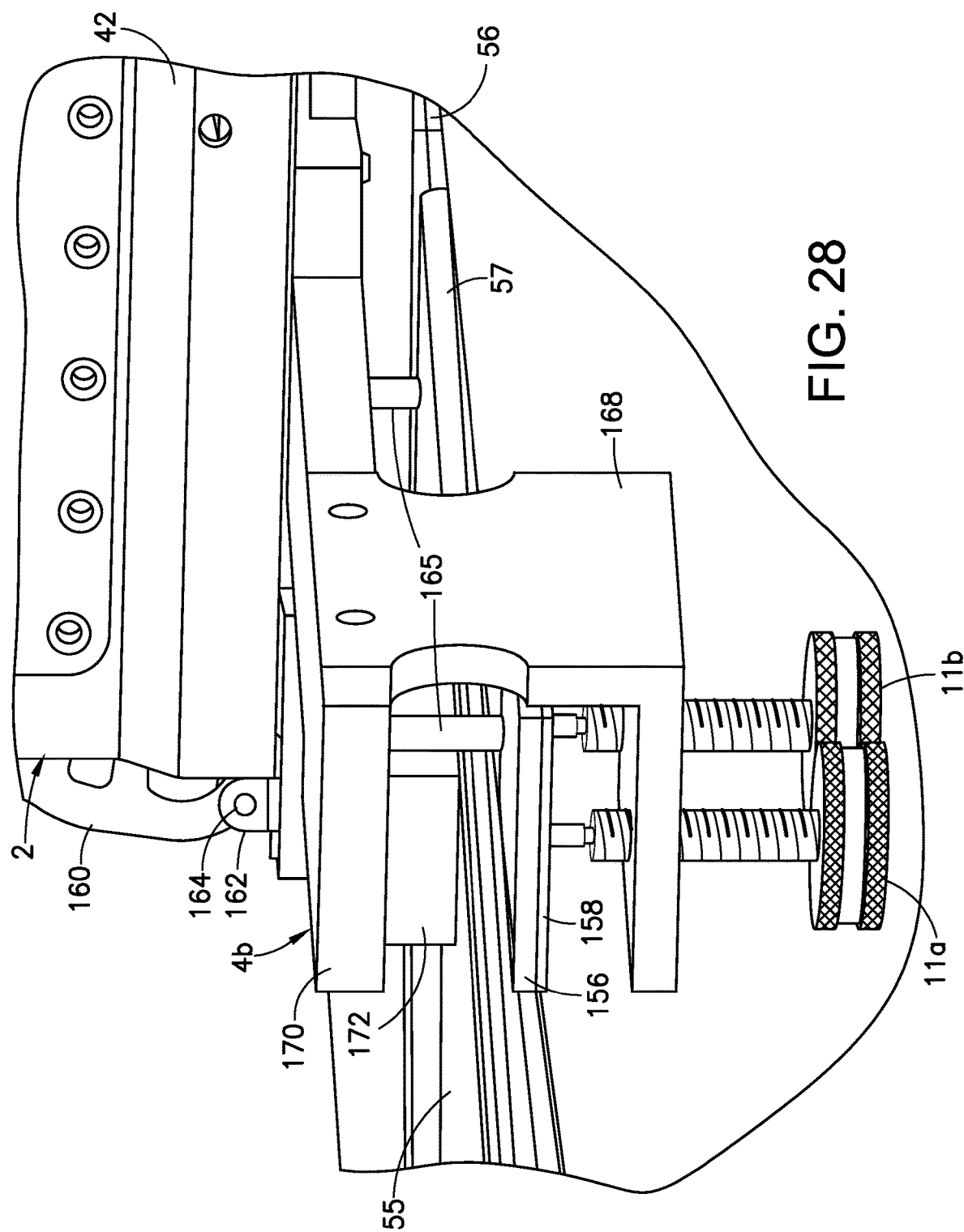

METHOD AND APPARATUS FOR REMOTE OPTICAL MEASUREMENT OF THE POSITION OF A SURFACE

RELATED PATENT APPLICATION

This application is a divisional of and claims priority from U.S. patent application Ser. No. 16/246,867 filed on Jan. 14, 2019.

BACKGROUND

The technology disclosed herein relates generally to systems and methods for measuring the position of a measurement surface relative to a reference position. In particular, the technology disclosed herein relates to systems and methods for calibrating steering devices to vehicle operator controls and, more specifically, to rigging aircraft control surfaces to aircraft operator controls.

Fluid dynamics includes the disciplines of aerodynamics and hydrodynamics to optimize fluid flow across control surfaces of a vehicle. The control surfaces are precisely moved by the operator during vehicle movement to create steering forces to direct the vehicle in a designated path and provide stability during travel. For example, a rudder may be adjusted to steer an aircraft or an elevator on a horizontal stabilizer may be positioned to stabilize lift forces. Complex three-dimensional shapes are often used as control surfaces to optimize fuel consumption and provide effective operation. These shapes in combination with the other surfaces determine vehicle performance characteristics.

Various rigging methods to calibrate control surfaces and related systems are known. A pivotable control surface (e.g., a rudder, an elevator, an aileron or a flaperon) may steer a vehicle (e.g., an aircraft). Deviations of the control surface shape may distort a relationship between the vehicle controls and the control surface. Calibration restores the relationship by establishing an alignment feature as part of the control surface which may be aligned to a rigging point on the vehicle associated with a known control setting. A metrology device and/or computer software may be used for calibration. The metrology device may define a positional relationship between a reference surface (e.g., an alignment indexing plate comprising a plurality of linear measurement markings) on the vehicle, a rotational axis of the control surface, and a target location (e.g., a neutral or zero position) of the alignment feature. By manipulating the control surface to a target relationship relative to the reference surface, the location of the alignment feature on the control surface may be calibrated relative to the operator controls. In this manner, the operator controls may be rigged to accurately reflect the true position of the control surface to improve vehicular performance.

Current tooling for control surface rigging on some aircraft can present concerns with respect to ensuring the accuracy of testing and the safety of aircraft and personnel. There is a need for a system and method that would enable a user to measure the positions of various control surfaces for rigging by non-contact means.

SUMMARY

The subject matter disclosed in detail below is directed to systems and methods for optically measuring a position of a measurement surface relative to a reference position. The system is a wireless network comprising a centrally located data acquisition computer and a suite (hereinafter "multiplicity") of remotely located sensors (hereinafter "sensor modules") mounted at different locations within wireless communication range of a central receiver. Each sensor module is configured to measure a position of a measurement surface relative to a reference position and then broadcast the measurement results, which broadcast results are received by the central receiver and processed by the data acquisition computer. The data acquisition computer hosts human interface software that displays measurement data.

In accordance with the example embodiments disclosed in some detail below, the sensor modules are mounted to an aircraft for use in a control surface rigging procedure. A system comprising a multiplicity of sensor modules mounted to an aircraft and configured to measure a position of a control surface relative to a reference position and then broadcast the measurement results will be referred to hereinafter as a "remote optical control surface indication system". The remote optical control surface indication system allows the user to measure the positions of control surfaces for rigging by non-contact means, thus eliminating the risk of human contact with hazardous aircraft energy.

More specifically, the remote optical control surface indication system includes a set of identical sensor modules that are affixed to various aircraft locations for the purposes of flight controls rigging. The sensors are equipped with optical components that measure the positions of flight control surfaces relative to adjacent aircraft geometry. Sensors are indexed to the aircraft by customized clamp assemblies, each having means for identifying the clamp and the sensor attached to the clamp. Measurements are sent wirelessly to a centrally located computer that hosts a data acquisition (DAQ) software application. The DAQ computer is capable of sending simple remote commands to the sensor modules. The kit is furnished with sensor zeroing cradle assemblies for software zeroing. When the remote optical control surface indication system is used for the purpose of flight controls rigging, data signals are generated which indicate when a control surface is at its zero-degree (neutral) position. [As used herein, the terms "zero position" and "neutral position" are synonymous.]

In accordance with one proposed implementation, each sensor module is mounted to a clamp that is made specific to a control surface location and embedded with a radio-frequency identification tag (hereinafter "RFID tag") to identify the clamp and corresponding location on the aircraft. The clamp indexes the sensor in relation to the control surface to be measured. The optical components of the sensor modules are selected to enable indication of the linear position of a flight control surface to a specified accuracy. The human interface software displays measurements and/or error states for each specific control surface, allowing the user to make fine adjustments to complete rigging procedures. However, the system could easily be employed in measuring things other than aircraft control surfaces, whenever real-time location-specific surface height measurements are needed.

The system proposed herein will save time during rigging jobs by not requiring a human presence at the measurement site. Instead, all sensors would be set up at once and later used to complete each rigging job in whichever order the technician desires without needing to communicate with another technician for manual measurements and without waiting for that technician to move between measurement locations. Each sensor unit would be kept in a power save mode (hereinafter "sleep mode") for long battery life and "woken up" for each rigging procedure. When each control surface is within the final rigging tolerance, the user would be able to send the measurement value from the human interface to an accredited automated test equipment workstation comprising a computer that is configured to interface with the computers onboard the aircraft and perform an inspection in lieu of a human inspector, saving time in the process.

Although systems and methods for optically measuring a position of a measurement surface relative to a reference position will be described in some detail below, one or more of those proposed implementations may be characterized by one or more of the following aspects.

One aspect of the subject matter disclosed in detail below is a method for optically measuring a position of a measurement surface relative to a reference position. The method comprises: (a) attaching a clamp to a reference surface at a location; (b) fixedly coupling a sensor module to the clamp so that a laser device inside the sensor module is aimed at a measurement surface; (c) activating the sensor module to project a curtain of light in a first plane from the laser device onto the measurement surface to form an impingement line using the laser device and detect an object centroid where light scattered from the impingement line impinges on a row of photodetectors of the sensor module; and (d) transmitting object centroid data signals from the sensor module to a data acquisition module, wherein the object centroid data signals represent a measured position of the measurement surface. In accordance with some embodiments, step (b) comprises orienting the sensor module so that the row of photodetectors are aligned in a second plane that is generally perpendicular to the first plane and intersects the curtain of light.

In accordance with one proposed implementation, at least one of the measurement surface and reference surface is a control surface of an aircraft. In that case the method further comprises: rotating the control surface by discrete degrees of actuation; repeating steps (c) at each discrete degree of actuation until the measured position of the control surface relative to a reference position is a neutral position; and rigging operator controls to accurately reflect the neutral position of the control surface based on object centroid data signals received from the sensor module.

Another aspect of the subject matter disclosed in detail below is a method for optically measuring a position of a measurement surface relative to a reference position, the method comprising: (a) attaching a first clamp to a first reference surface at a first location, wherein the first clamp has a first structure designed to clamp onto the first reference surface at the first location; (b) fixedly coupling a first sensor module to the first clamp so that a first laser device inside the first sensor module is aimed at a first measurement surface; (c) wirelessly activating the first sensor module in an active mode to project a first curtain of light in a first plane from the first laser device onto the measurement surface to form a first impingement line and detect a first object centroid where light scattered from the first impingement line impinges on a first row of photodetectors of the first sensor module; (d) wirelessly transmitting first object centroid data signals from the first sensor module to a data acquisition module, wherein the first object centroid data signals represent a measured position of the first measurement surface relative to a first reference position; (e) attaching a second clamp to a second reference surface at a second location, wherein the second clamp has a second structure designed to clamp onto the second reference surface at the second location and different from the first structure; (f) fixedly coupling a second sensor module to the second clamp so that a second laser device inside the second sensor module is aimed at a second measurement surface; (g) wirelessly activating the second sensor module in an active mode to project a second curtain of light in a second plane from the second laser device onto the measurement surface to form a second impingement line and detect a second object centroid where light scattered from the second impingement line impinges on a second row of photodetectors of the second sensor module; and (h) wirelessly transmitting second object centroid data signals from the second sensor module to the data acquisition module, wherein the second object centroid data signals represent a measured position of the second measurement surface relative to a second reference position. In accordance with one proposed implementation, the first sensor module is in a sleep mode during step (g) and the second sensor module is in a sleep mode during step (c).

In accordance with some embodiments of the method described in the immediately preceding paragraph, step (d) further comprises also wirelessly transmitting first clamp identification data signals representing an identity of the first clamp from the first sensor module to the data acquisition module, and step (h) further comprises also wirelessly transmitting second clamp identification data signals representing an identity of the second clamp from the second sensor module to the data acquisition module.

In accordance with one proposed implementation, at least one of the first measurement surface and first reference surface is a first control surface of an aircraft, and at least one of the second measurement surface and second reference surface is a second control surface of the aircraft. In this case the method further comprises: rigging operator controls to accurately reflect a neutral position of the first control surface based on the first object centroid data signals and the first clamp identification data signals received from the first sensor module; and rigging operator controls to accurately reflect a neutral position of the second control surface based on the second object centroid data signals and second clamp identification data signals received from the second sensor module.

A further aspect of the subject matter disclosed in detail below is an apparatus comprising a clamp and a sensor module latched to the clamp, wherein the sensor module comprises a housing and first and second catches disposed on opposite sides of the housing, and the clamp comprises: a clamp block; first and second latches pivotably coupled to the clamp block and latched to the first and second catches to hold the sensor module flush against the clamp block; first and second indexing pins projecting from the clamp block; a clamp arm rigidly coupled to the clamp block and having a portion with first and second threaded bores; first and second screws threadably coupled to the first and second threaded bores respectively and having respective ends; and a pressure plate movably coupled to the clamp arm and disposed between the clamp block and a portion of the clamp arm, wherein the ends of the first and second screws are in contact with the pressure plate.

In accordance with some embodiments of the apparatus described in the immediately preceding paragraph, the clamp further comprises a contact pad attached to the clamp block and disposed between the clamp block and the pressure plate, wherein the contact pad is made of polymeric material. In accordance with some embodiments, the clamp comprises an identifier and the sensor module comprises means for identifying the clamp.

Other aspects of systems and methods for optically measuring a position of a measurement surface relative to a reference position are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects.

FIG. 1A is a diagram showing: (a) a laser device projecting a light curtain in a first plane P1 onto a measurement surface to form an impingement line; (b) a row of photodetectors aligned in a second plane P2 that is generally perpendicular to the first plane P1 and intersects the light curtain; and (c) an object centroid D where light scattered from the impingement line impinges on the row of photodetectors.

FIGS. 7A and 7B are diagrams representing front and rear three-dimensional views respectively of a sensor module seated in a zeroing cradle in accordance with one proposed implementation.

FIG. 28 is a diagram representing a three-dimensional view of some components of a flaperon clamp assembly for installation in the embodiment depicted in FIG. 23.

Reference will hereinafter be made to the drawings in which similar elements in different drawings bear the same reference numerals.

DETAILED DESCRIPTION

Illustrative embodiments of systems and methods for optically measuring a position of a measurement surface relative to a reference position are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system is a wireless network comprising a centrally located data acquisition computer and a multiplicity of remotely located sensor modules mounted at different locations within wireless communication range of a central receiver (e.g., a USB dongle plugged into a USB port of the data acquisition computer). Each sensor module is configured to measure a position of a measurement surface relative to a reference position and then broadcast the measurement results, which broadcast results are received by the central receiver and processed by the data acquisition computer. Before specific implementations of such a wireless network are described, the basic principle underlying the optical measurement technique employed by the sensor modules will be described in some detail.

Figure 1:
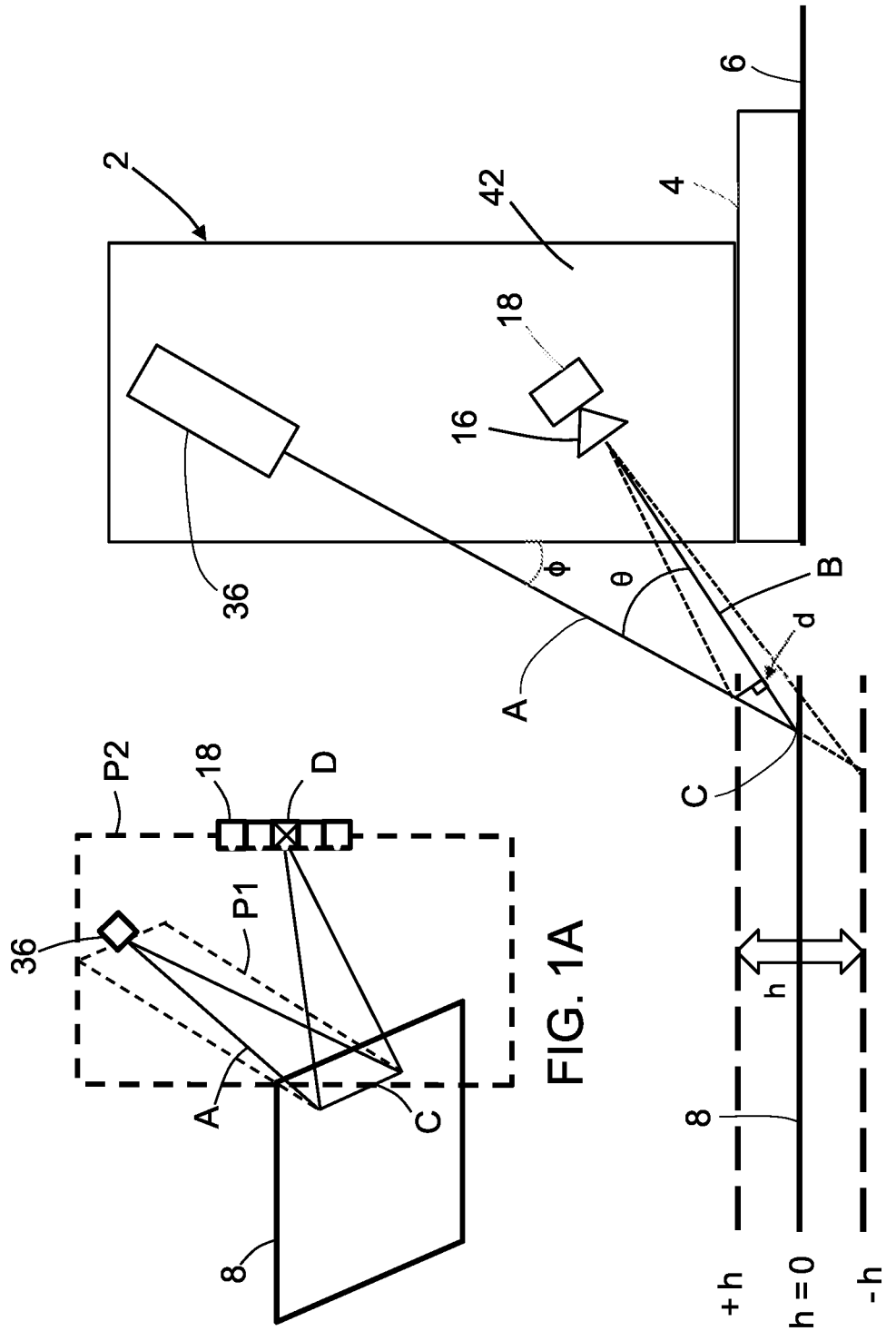
FIG. 1 is a diagram showing the optical path of the laser light emitted by a sensor module in accordance with one embodiment.

FIG. 1 is a diagram showing the optical path of the laser light emitted by a sensor module 2 that is attached to a clamp 4 in accordance with one embodiment. In this example, the clamp 4 is coupled to a reference surface 6, which reference surface 6 is disposed adjacent to a measurement surface 8 (such as a pivoting control surface on an aircraft). The sensor module 2 is configured to measure the position (e.g., the height h) of the measurement surface 8 relative to a zero (reference) position indicated by the solid line at h=0 in FIG. 1 between two dashed lines. The upper dashed line represents an instance in which the measurement surface 8 is at a height h above the reference position (h=0); the lower dashed line represents an instance in which the measurement surface 8 is at a height −h below the reference position (h=0).

The sensor module 2 includes a housing 42 and a battery (not shown, but see battery 30 in FIG. 4) contained within the housing 42. The sensor module 2 further includes a line-emitting laser device 36 (hereinafter "laser device 36"). The laser device 36 is mounted inside the housing 42 and is configured to project a curtain of light (hereinafter "light curtain A") in a first plane that is oriented perpendicular to the page in FIG. 1. When the light curtain A impinges on the measurement surface 8, a laser line C (again extending perpendicular to the page in FIG. 1) is formed.

In one implementation, the laser device 36 is a VLM-635-27-LPA laser diode manufactured by Quarton, Inc., Taipei City, Taiwan. The VLM-635-27-LPA laser diode uses a simple cylindrical lens made of quartz and transmits light having a center wavelength of 635 nm. The cylindrical lens converts the laser beam into a curtain of light in a plane. The curtain of light is directed onto the measurement surface, where an impingement line is detectable.

Figure 2:
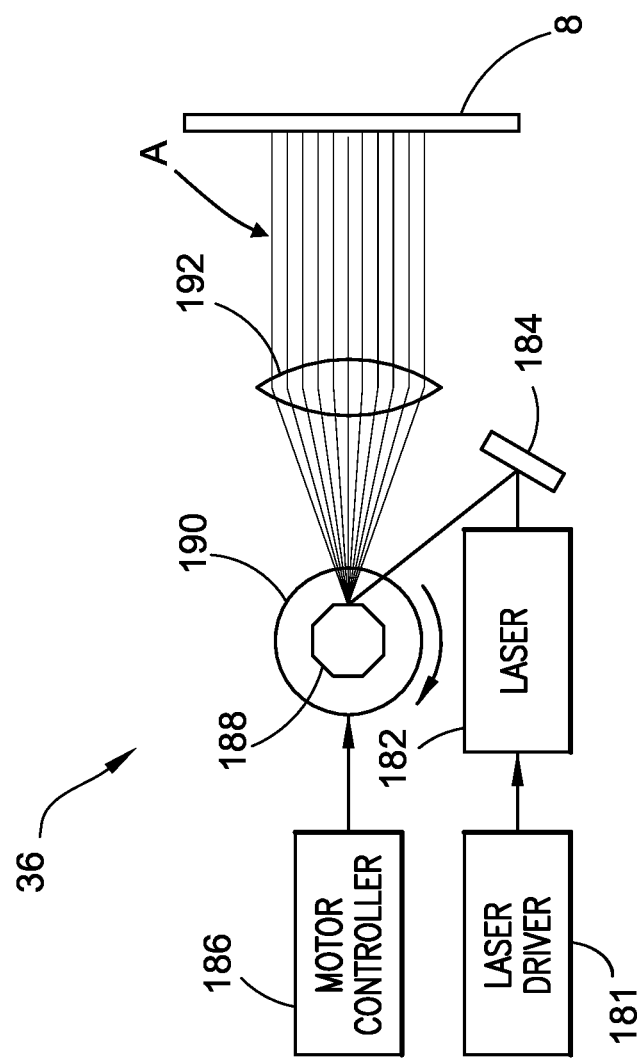
FIG. 2 is a diagram identifying components of a commercially available off-the-shelf (COTS) line-emitting laser device that may be part of the sensor module depicted in FIG. 1 in accordance with one proposed implementation.

In an alternative implementation, a laser device having a rotating polygonal mirror may be used to produce the laser line C. FIG. 2 is a diagram identifying components of a line-emitting laser device 36 that is suitable for use in the position measurement system proposed herein. The laser device 36 depicted in FIG. 2 includes a polygonal mirror 188 mounted on the output shaft of a motor 190. Rotation of the polygonal mirror 188 is controlled by a motor controller 186 which receives clock pulses from a clock (not shown) and converts those clock pulses into motor drive pulses. The laser device 36 depicted in FIG. 2 further includes a laser driver 181 that drives a laser 182 to generate a continuous-wave or pulsed laser beam that is directed at a mirror 184 (or other reflective surface). The mirror 184 is oriented such that the projected laser beam is reflected onto the polygonal mirror 188 rotating at high speed in exact synchronism with the clock pulses from the clock. As the angle of each reflective facet of the polygonal mirror 188 changes during rotation, a line-emitting laser beam A is reflected by each facet onto a collimating lens 192. The reflected beam sweeps across the input surface of the collimating lens 192, but the photons change direction as they propagate through the collimating lens 192, exiting the collimating lens 192 in parallel.

Referring again to FIG. 1, the sensor module 2 further includes a compound lens 16 (hereinafter "lens 16") and a linear array of photodetectors 18 arranged in sequence to form a row along a straight line inside the housing 42. The lens 16 is mounted inside the housing 42 in front of the row of photodetectors 18. The photodetectors 18 are configured to output respective analog photodetector output signals in response to impinging light.

In the instance wherein the measurement surface 8 is at the zero position (indicated by the solid horizontal straight line labeled "8" in FIG. 1), the impingement of the light curtain A on the measurement surface 8 produces the laser line C. The measurement surface 8 in turn scatters that impinging light of laser line C. Some of the scattered laser light enters the lens 16 and is detected by the row of photodetectors 18. In the scenario depicted in FIG. 1, the light impinging on the row of photodetectors 18 includes scattered light from laser line C.

FIG. 1A is a diagram showing the laser device 36 projecting a light curtain A in a first plane P1 onto a measurement surface 8 to form an impingement line C and a row of photodetectors 18 aligned in a second plane P2 that is generally perpendicular to the first plane P1 and intersects the light curtain A. FIG. 1A also indicates an object centroid D where light scattered from the impingement line C impinges on the row of photodetectors 18.

To better explain the optical measurement technique used by the sensor module 2, the following discussion assumes that the reference surface 6 and measurement surface 8 depicted in FIG. 1 are planar and that measurement surface 8 is part of a component that is pivotable about an axis that is parallel to the plane of the measurement surface 8. As the component pivots, the measurement surface 8 moves up or down (as depicted by arrows in FIG. 1) in dependence upon the direction of component rotation. Rotational motion is approximated as linear (up and down) motion at the measurement area. This is a reasonable approximation based on the small-angle formula.

Preferably the sensor module 2 is situated so that the laser device 36 transmits the light curtain A downward at an angle φ (measured relative to a reference plane of the sensor module 2) onto the measurement surface 8, thereby projecting a generally horizontally oriented laser line C onto the measurement surface 8. In contrast, the lens 16 is arranged so that the focal axis B of lens 16 is directed downward at an acute angle A relative to the light curtain A. In addition, the focal axis B of lens 16 and the straight line of the row of photodetectors 18 lie in a second plane (disposed in the plane of the page in FIG. 1) that intersects the first plane (disposed perpendicular to the plane of the page in FIG. 1) in which the light curtain A lies.

The impinging light from laser line C is scattered in all directions by the measurement surface 8, including toward the lens 16. However, the vertically oriented linear array of photodetectors 18 only sees a thin cross section of scattered light from the laser line C (analogous to a horizon line being viewed through a tall narrow window). In the parlance of computer vision object tracking, the "object" is the real-world target. In this case, the object is the laser line C, and the centroid of the object is the point at the center of the thin cross section of scattered light from the laser line which impinges on the linear array of photodetectors 18. (The thin slice, or "cross section" of scattered light from the laser line rises and falls in intensity from top to bottom (or vice versa); the intensity of the cross section peaks in the center, with the falloff following the Gaussian distribution.)

The position of the impingement of the laser light onto the photodetector (or photodetectors) is a function of the apparent height d (see FIG. 1) of the measurement surface 8. The apparent height d is a function of the actual height h. Thus the row of photodetectors 18 may be used to measure the height h of the measurement surface 8 that scattered the laser line toward the photodetector array.

More specifically, the theoretical relationship between actual height h and apparent height d is $d=(h/\cos(\varphi))\sin(\theta)$. The actual mathematical relationship is dependent on the geometry of the compound lens 16 and manufacturing variables. An example empirical equation relating beam position x in pixels to actual height h is:

$$x = 2\sqrt{\frac{5}{286511}} \sqrt{250h - 9141} - \frac{3934}{3125}$$

For the sake of illustration, assume that the focal axis B of lens 16 intersects the laser line C when the measurement surface 8 is in the middle position indicated in FIG. 1 by the horizontal solid straight line labeled h=0 (which condition is unnecessary to practice of the method of measurement disclosed herein). In that scenario, the particular photodetectors that detect a centroid of the scattered light from laser line C will vary in position as the measurement surface 8 moves up to the upper position indicated in FIG. 1 by the horizontal dashed straight line labeled +h. Similarly, the particular photodetectors that detect a centroid of the scattered light from laser line C will vary in position as the measurement surface 8 moves down to the lower position indicated in FIG. 1 by the horizontal dashed straight line labeled −h. In other words, the position of the centroid-detecting photodetector (or pair of centroid-detecting photodetectors) varies as the position of the measurement surface varies.

Figure 3:
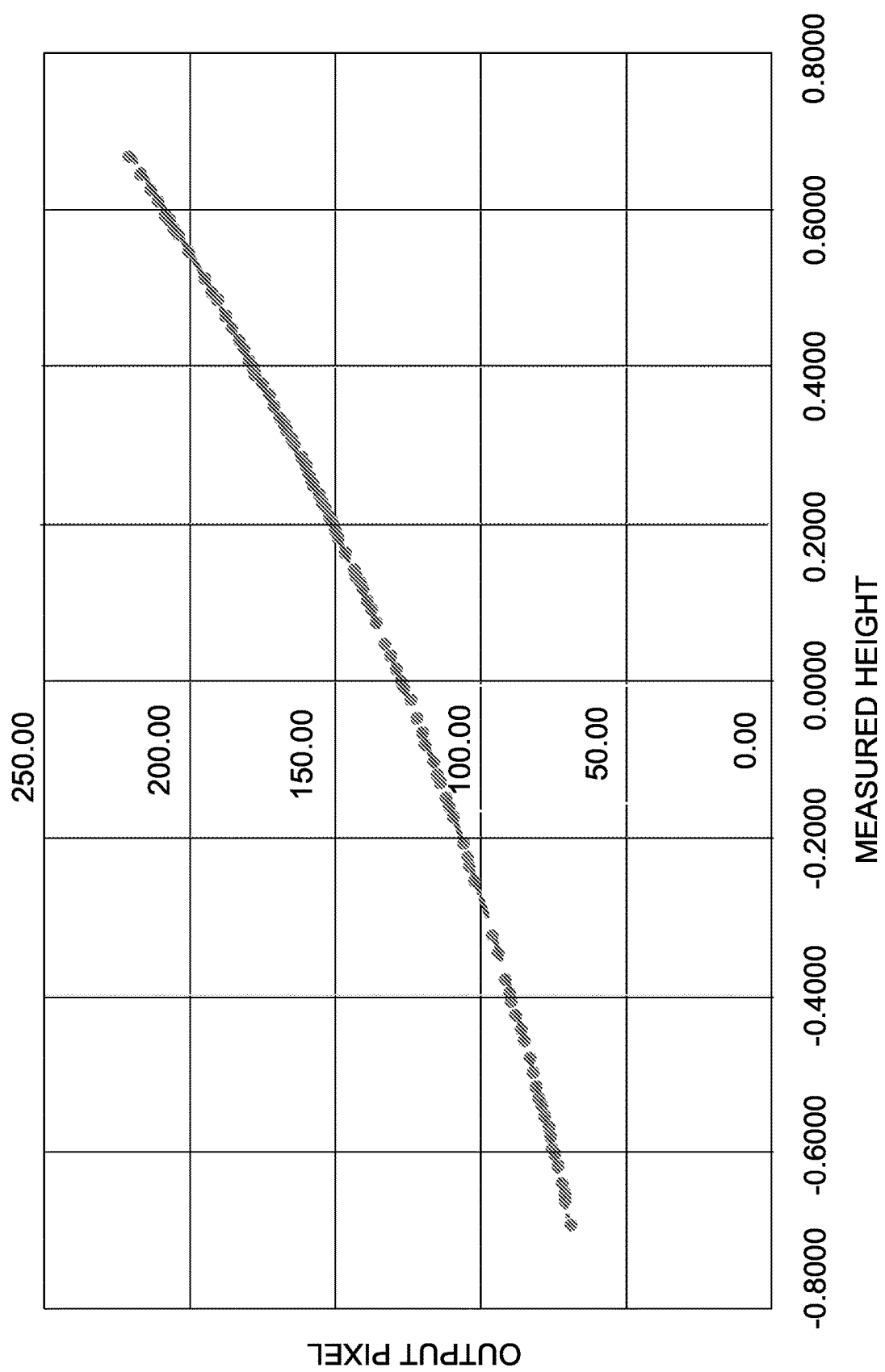
FIG. 3 is a graph of pixel data points as a function of measured height during movement of a measurement surface in the field of view of the sensor module depicted in FIG. 1.

FIG. 3 is one example of a graph of pixel data points as a function of measured height. The pixel data points (which form a sensor response curve) were generated after an interpolation process (executed by a microcontroller, described in some detail below) that doubles the number of data points by injecting a new data point between each existing one on the linear array of photodetectors 18. The pixel data points are then processed to derive an object centroid calculated in units of pixels.

The object centroids are plotted in FIG. 3, and those outputs are used to generate the overall sensor response curve, which is an account of the output centroids in units of pixels versus the actual height position of the measurement surface. The centroid calculation uses pixel intensity thresholding (as described below with reference to FIG. 14). All of the pixel calculations use only the data gathered by the pixel photodetectors.

Figure 4:
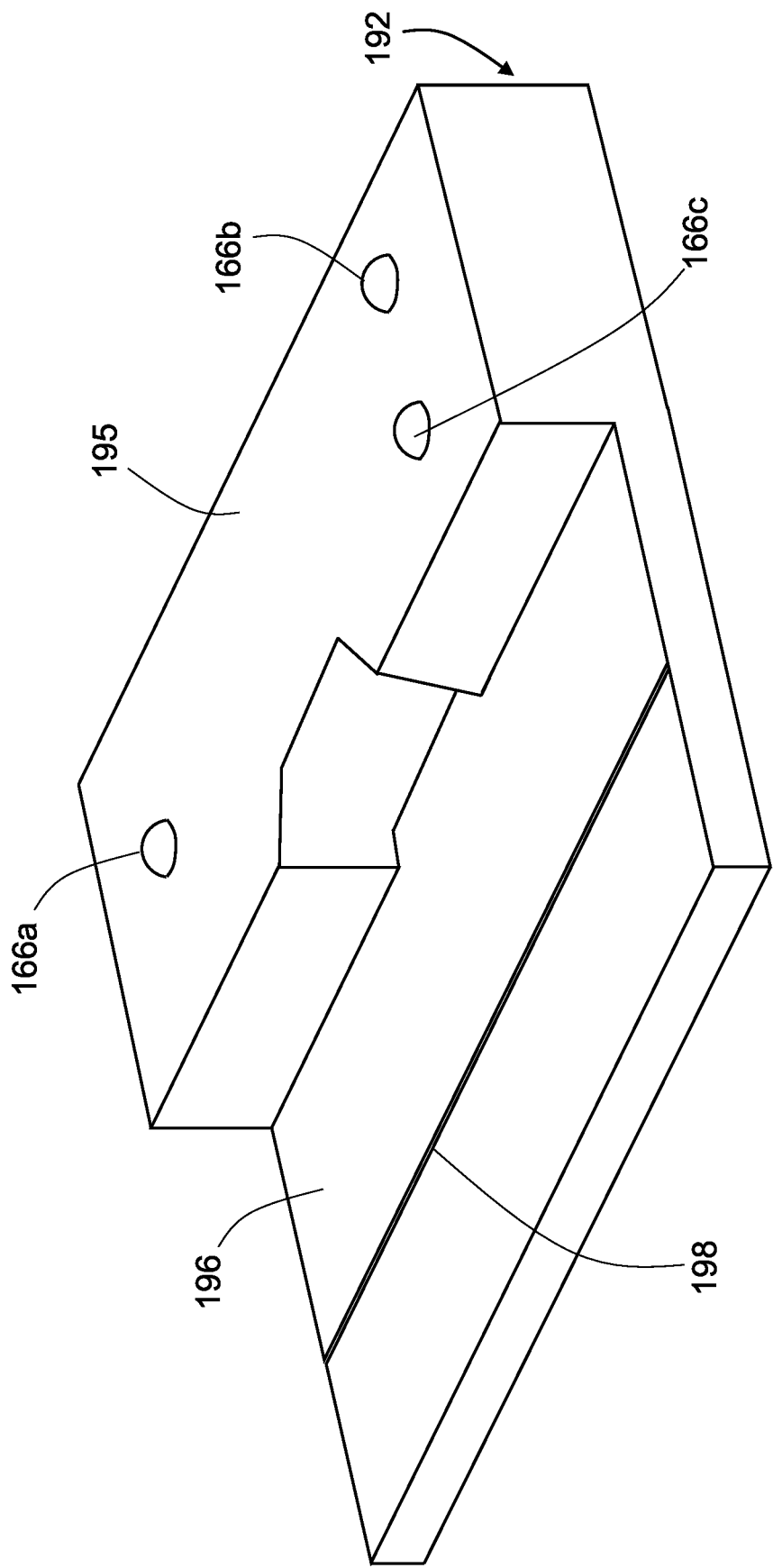
FIG. 4 is a diagram representing a three-dimensional view of a zeroing jig that can be used to calibrate the sensor module depicted in FIG. 1.

Before the sensor module 2 is ready for use in a rigging operation, the sensor module 2 should be calibrated. FIG. 4 is a diagram representing a three-dimensional view of a zeroing jig 194 that can be used to calibrate the sensor module 2. The zeroing jig 194 has a sensor module support surface 195, a laser zeroing surface 196 and a flood zeroing line 198. While operating in the laser mode, the sensor module 2 is calibrated by determining which photodetector detects the object centroid when the sensor module 2 emits a light curtain A that impinges on the laser zeroing surface 196. The position of the laser zeroing surface 196 relative to the sensor module frame of reference is selected to match the neutral position of the control surface when the sensor module 2 is installed. In one implementation, the standard height of the sensor assembly from the neutral plane is ½ inch.

The zeroing function is started by either booting the sensor module 2 on the zeroing jig 194 or placing the sensor module 2 onto the zeroing jig 194 after the sensor module 2 has been turned on but prior to placing the sensor module 2 on any clamp. The zeroing jig 194 has an RFID tag like the clamps do, so that the sensor module 2 device knows when it is on the zeroing jig 194. The zeroing process starts automatically when the zeroing jig 194 is detected.

The sensor module 2 is also operable in a flood mode. In the flood mode, an array of light-emitting diodes (LEDs) (not shown in FIG. 1, but see LED array 34 in FIGS. 5 and 25) are activated to project light that illuminates the flood zeroing line 198. While operating in the flood mode, the sensor module 2 is calibrated by determining which photodetector detects the object centroid when the sensor module 2 emits a flood of light that impinges on the flood zeroing line 198 and areas adjacent thereto. In this case, the object centroid is due to light not scattered toward the photodetectors by the flood zeroing line 198.

Figure 5:
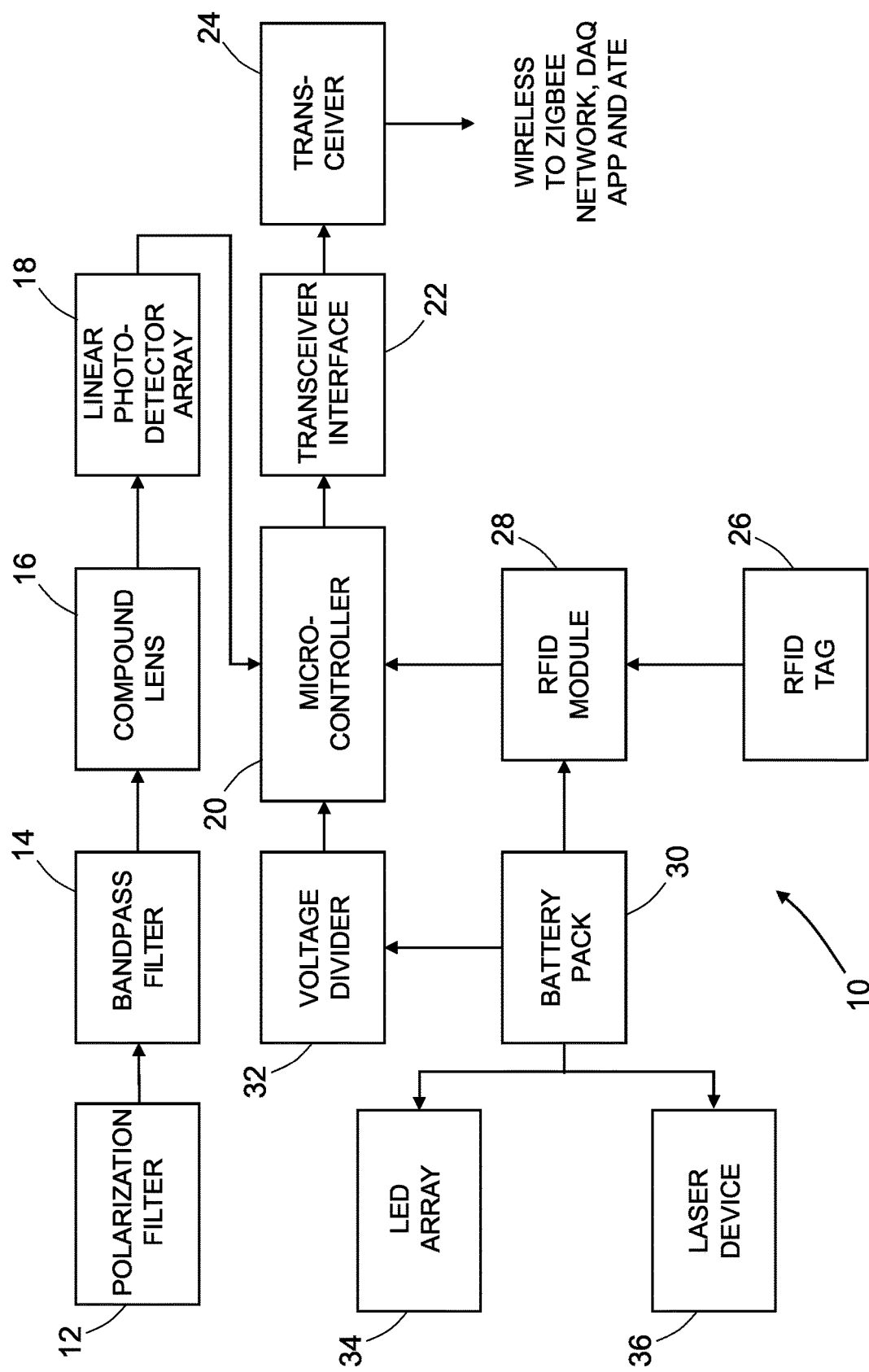
FIG. 5 is a diagram identifying components of the sensor module depicted in FIG. 1 in accordance with one embodiment.

FIG. 5 is a diagram identifying components of the sensor module 2 depicted in FIG. 1 and a component (RFID tag 26) that is part of the clamp in accordance with one embodiment. The sensor module 2 includes a battery pack 30 that provides power to all of the electrical-powered devices onboard the sensor module 2. In one proposed implementation, the battery pack 30 includes six AA batteries. In one proposed implementation, the battery pack 30 includes rechargeable lithium-ion batteries.

The electrical-powered devices contained within housing 42 of the sensor module 2 include a microcontroller 20, a transceiver 24, an RFID module 28, an LED array 34, a line-emitting laser device 36, and a linear charge-coupled device array 46 (hereinafter "linear CCD array 46"). The linear CCD array 46 includes the aforementioned linear array of photodetectors 18. More specifically, pixels are represented by p-doped metal-oxide-semiconductor (MOS) capacitors. These capacitors are biased above the threshold for inversion when image acquisition begins, allowing the conversion of incoming photons into electron charges at the semiconductor-oxide interface. The CCD array 46 then reads out these charges to the microcontroller 20.

The sensor module 2 further includes optical components arranged in the following sequence within housing 42: a polarization filter 12, a bandpass filter 14. a compound lens 16 and a row of photodetectors 18. The scattered light from the laser line C passes through the polarization filter 12, which attenuates light that is not oriented in the direction parallel to the surface to aid in isolation of reflected laser light. The polarization filter 12 reduces glare and outside light interference. In one implementation, the bandpass filter 14 is a piece of red coated glass that has a transmission curve with a sharp peak at the same wavelength as the laser light (e.g., 635 nm) and a high extinction coefficient at other wavelengths. This filters out the majority of outside interference light, thereby isolating the laser light from ambient light. The filtered light then impinges on the compound lens 16. The single row of photodetectors (pixels) are oriented vertically and aimed downward toward the measurement surface 8 at a preset angle. The photodetectors 18 capture laser light scattered from the measurement surface 8. In one implementation, the linear array includes 128 photodetectors (pixels).

Still referring to FIG. 5, the photodetectors 18 output analog photodetector output signals (hereinafter "pixel data") to a microcontroller 20. The microcontroller 20 connects to all peripherals and handles logic input/output, serial communication, sensor inputs and power distribution. The microcontroller 20 is configured to execute a laser line tracking algorithm that includes the following operations: finding an intensity baseline and peak, correcting light intensity for lens vignette artifact, interpolating the pixel data for pseudo-sub-pixel resolution, object detection thresholding and calculation of the object centroid. The microcontroller 20 is also configured to output serial payload containing object centroid data in terms of pixel numbers indicating which photodetectors detected the object centroid. In accordance with one implementation, the serial data is output at a rate of about 20 Hz. The microcontroller 20 receives electric power from the battery pack 30 via a voltage divider 32. The voltage divider 32 scales battery voltage down for analog voltage reading.

The microcontroller 20 outputs the serial data to a transceiver 24 via a transceiver interface 22. The transceiver 24 handles the network communication protocol. In one implementation (described in more detail below with reference to FIGS. 9 and 10), the network is a Zigbee network 60. Zigbee is an IEEE 802.15.4-based specification for a suite of high-level communication protocols used to create close-proximity area networks with small, low-power digital radios.

The microcontroller 20 also controls the operation of the laser device 36 and the LED array 34. As previously described with reference to FIG. 1, the laser device 36 emits a light curtain A that is aimed downward toward the measurement surface 8 at a preset angle, forming a horizontally oriented laser line C when the light curtain A impinges on the measurement surface 8. In one implementation, the emitted laser light has a wavelength range that is centered at 635 nm (red). The LED array 34 illuminates the measurement surface 8 (or optical target) in lieu of laser light in some applications (described in more detail below).

In accordance with one embodiment, the sensor module 2 further includes an RFID module 28 that is configured to read an RFID tag 26 which is embedded in the clamp assembly to which the sensor module 2 is mounted. The RFID tag identifies which clamp assembly that sensor module 2 is mounted to. Since the identity and location on the aircraft of each clamp assembly are known, the identification of the clamp assembly enables a centrally located computer to determine which control surface is being measured remotely.

Figure 6:
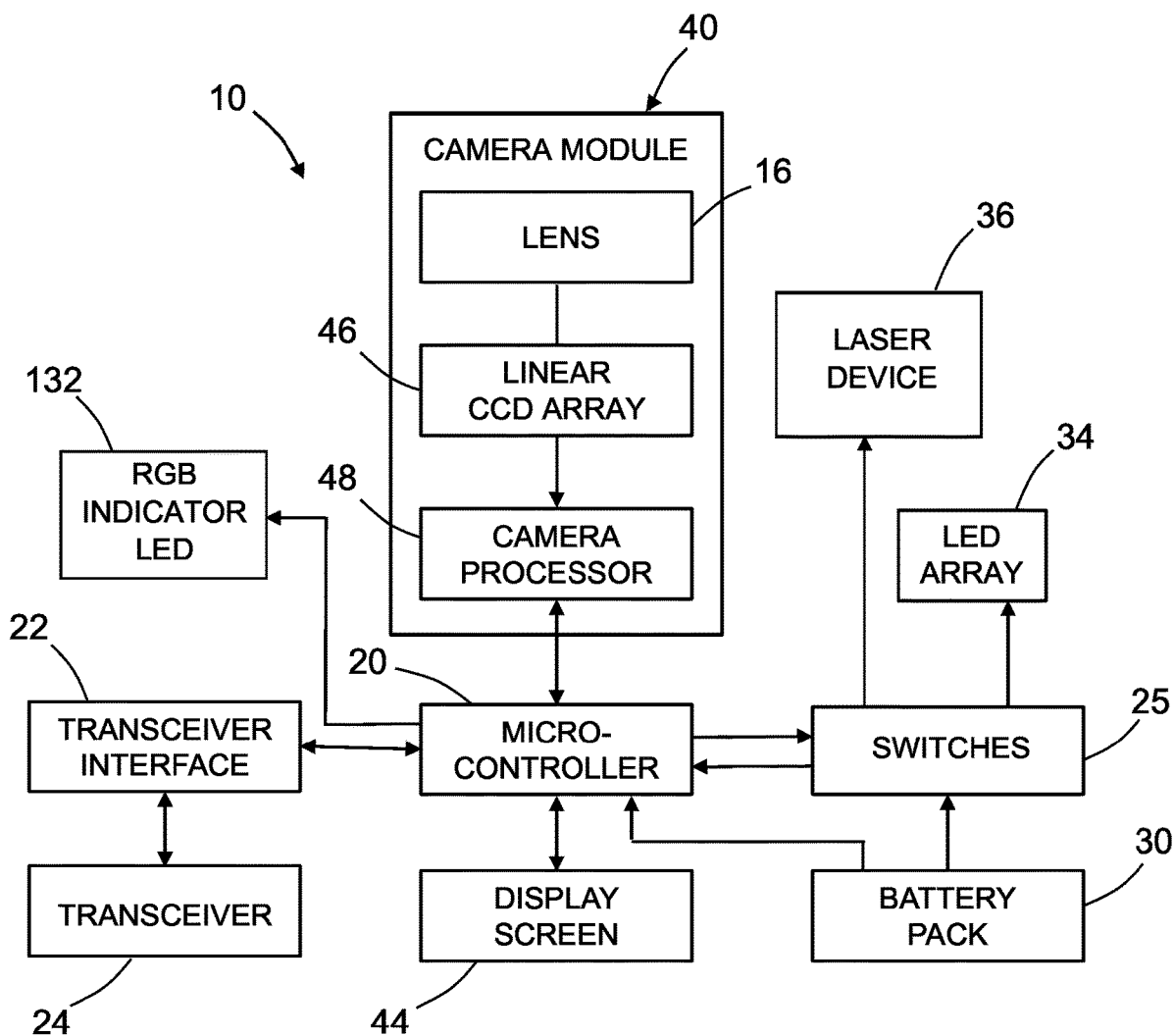
FIG. 6 is a diagram identifying components of the sensor module depicted in FIG. 1 in accordance with one proposed implementation.

FIG. 6 is a diagram identifying components of the sensor module 2 depicted in FIG. 1 in accordance with one proposed implementation. In this implementation, the photodetectors 18 are incorporated in a linear CCD array 46 that is mounted to a sensor board. The compound lens 16 is a 12-mm lens mounted to the same sensor board. The linear CCD array 46 has a single row of photodetectors (pixels) oriented vertically and aimed downward toward the measurement surface 8 at a preset angle. The linear CCD array 46 captures laser light scattered from the measurement surface 8.

In one implementation, the linear CCD array 46 is a TAOS TSL1401R 128-pixel linear array sensor (commercially available from Texas Advanced Optoelectronic Solutions, Plano, Tex.). The TSL1401R chip consists of a single row of 128 photodetectors. The lens 16 forms images on the sensor array. The camera processor 48 starts and stops exposures, and then responds to clocking pulses with the voltage levels of each incrementing pixel. The microcontroller 20 reads off the pixel values. The camera module 40 allows a host system to "see" in one dimension.

The microcontroller 20 handles all analog and digital inputs and outputs, runs the sensor module programming, and stores the zero position to EEPROM memory. In one implementation, the main microcontroller board is an Arduino Mega 2560 microcontroller board, which has 54 digital input/output pins (of which 15 can be used as PWM outputs to the LED array 34), 16 analog inputs, four UARTs (hardware serial ports) (one of which is used to connect the camera board to the main microcontroller board), a 16-MHz crystal oscillator, a USB connection, and a power jack.

The microcontroller 20 also controls the on/off state of the LED array 34, but it does so via switches 25. In one implementation, the switches 25 include two reverse-biased MOSFET transistors: one for the flood LED array 34 and one for the laser device 36. The camera module 40 is powered while the sensor module is in the sleep mode. The LED array 34 includes three individual LEDs powered by DC current. In one implementation, the three LEDs are powered by three 2-V linear voltage regulators, which are in turn all powered by the one MOSFET designated for switching LED power. All three voltage regulators and the two MOSFETs are found on a "jumper board" (not shown in the drawings), which also holds three resistors for an RGB indicator LED 132, two pull-down resistors for biasing the MOSFETs, a USB port wired in parallel with the Arduino's native USB port, and screw terminals for all of the peripherals and power connections. The jumper board sits on top of the transceiver interface board and has through pins for access to all of the Arduino pins. The main purpose of the jumper board is to ease final assembly by providing strong terminal connections and to hold those other components. In the implementation partly depicted in FIG. 6, the transceiver 24 is an Xbee radio module operating at 2.4 GHz, and the transceiver interface 22 is an Xbee shield that interfaces with the Arduino microcontroller and provides power to the Xbee radio. The microcontroller 20 communicates with the transceiver 24 via the transceiver interface 22. The transceiver 24 is capable of wirelessly relaying measurements and commands between the microcontroller 20 and a centrally located data acquisition computer (hereinafter "DAQ computer").

In one implementation, the transceiver 24 is an Xbee Pro S1 802.15.4 module, while the transceiver interface 22 is a Seeedstudio Xbee shield with a serial peripheral interface (SPI) pass-through suitable for routing signals between Xbee radios and Arduino microcontroller boards. (A "shield" is any board that is made to fit the layout and plug right into an Arduino microcontroller board.) The Xbee Pro S1 802.15.4 module is mounted on the Seeedstudio Xbee shield. The latter provides power to the former, contains circuitry for logic input/output, and allows the user to select serial pins with jumpers. The Xbee Pro S1 802.15.4 module has its own processor built in. The Xbee is pre-programmed prior to installation and then sends and receives data to and from the Arduino microcontroller board. Once the Xbee is programmed and installed, it operates autonomously.

The battery pack 30 supplies constant-voltage power. Battery power goes straight from the on/off switch to the microcontroller 20 and the voltage divider 32, which are wired in parallel. The microcontroller 20 in turn supplies appropriate voltages to the display screen 44, the transceiver interface 22, and the RGB indicator LED 132. The RGB indicator LED 132 is mounted on the housing 42 of the sensor module 2 and serves to indicate when the device is turned on, when a valid target has been detected, and when an error state is indicated. In particular, the RGB indicator LED 132 illuminates in different colors to convey status information at a distance.

The microcontroller 20 also controls the display screen 44. In one implementation, the display screen 44 is a liquid crystal display (LCD) screen that displays sensor status information useful for workflow and troubleshooting.

Figure 7B:
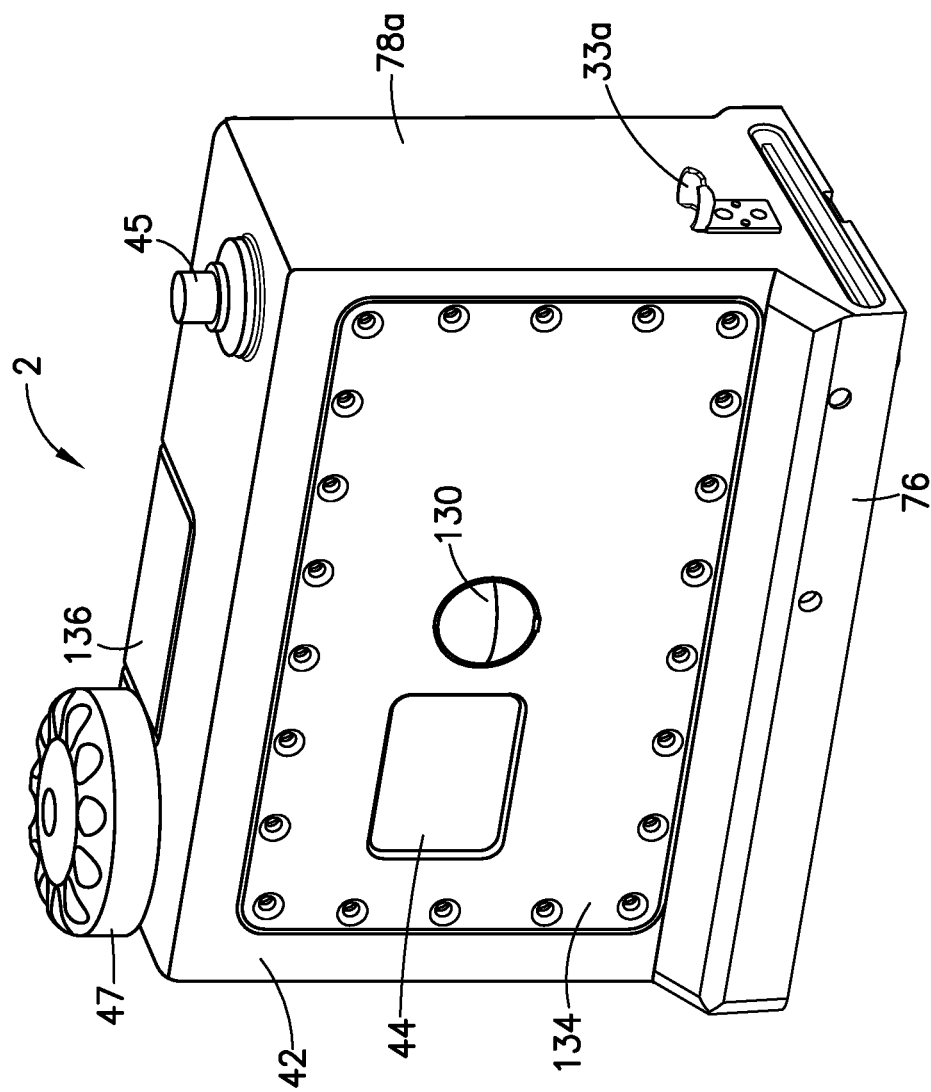

FIGS. 7A and 7B are diagrams representing front and rear three-dimensional views respectively of a sensor module 2 in accordance with one proposed implementation. The housing 42 of the sensor module 2 has a flat base 76 that is designed to sit flush on a clamp. A pair of catches 33a and 33b (only one of which is visible in FIGS. 7A and 7B, but see FIG. 8) are fastened to opposing end walls 78a and 78b of the housing 42. As will be described in some detail below with reference to FIGS. 27A and 27B, respective latches are latched onto the catches 33a and 33b to hold the sensor module 2 onto the clamp. The housing 42 has an opening (not visible in FIGS. 7A and 7B) in a top wall that is closed by a battery cap 47. The battery cap 47 is removed before inserting or removing batteries.

After the sensor module 2 has been mounted to a clamp, which clamp has in turn been attached to a reference surface, the sensor module is turned on manually by pressing the main power button 45 situated on top of the housing 42. The microcontroller 20 is configured to default to the sleep mode in response to activation of the module. In response to receipt of a "wake" command from a central station, the remotely located sensor module 2 changes to the laser mode. In response to detection of a flood command encoded in the RFID tag 26, the sensor module 2 changes to the flood mode.

As shown in FIG. 7A, the housing 42 includes an optical scaffold 136 that holds the camera board assembly, the laser device 36, the LED array 34, two light filters, and a polycarbonate laser aperture pane. The optical scaffold 136 is permanently bonded to the rest of the housing 42. The optical scaffold 136 has a surface configuration designed to not block light transmitted from or backscattered to the optical components inside the housing 42. In the implementation depicted in FIG. 7A, the surface configuration of the optical scaffold 136 includes a concavity 136a having a planar surface that is generally parallel to the plane in which the light curtain A propagates. The concavity 136a has an aperture 43 that is aligned with the laser device 36. The surface configuration of the optical scaffold 136 further includes a concavity 136b having a planar surface that is generally parallel to an axis of the LED array 34. The concavity 136b has an aperture that is aligned with the LED array 34. The surface configuration of the optical scaffold 136 further includes a concavity 136c having an aperture that is aligned with the lens 16.

As shown in FIG. 7B, the housing 42 also includes a removable rear access panel 134 that allows access to the interior of the housing 42 when removed. The rear access panel 134 has one opening for a display screen 44 and another opening for an optically transparent hemispherical LED bubble 130. The RGB indicator LED 132 protrudes through the rear access panel 134 and into an alcove within the LED bubble 130.

Figure 8:
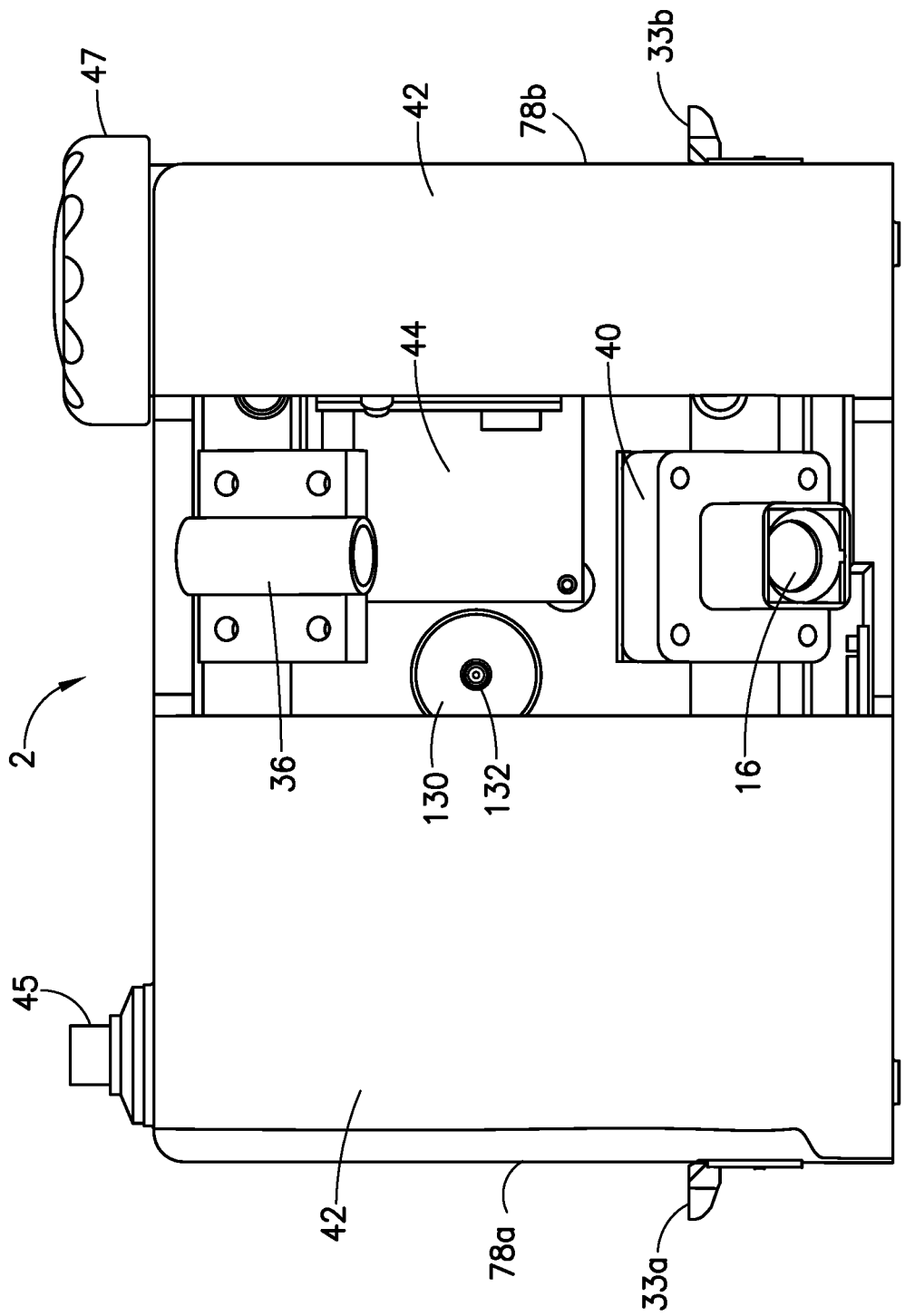
FIG. 8 is a diagram representing a front view of the sensor module depicted in FIGS. 7A and 7B with a portion of the housing removed and without a zeroing cradle.

FIG. 8 is a diagram representing a front view of the sensor module depicted in FIGS. 7A and 7B with the optical scaffold 136 and other components removed. The axis of the laser device 36 is disposed at a preset angle $\varphi$ (see FIG. 1) relative to a vertical mid-plane of the housing 42. Likewise the focal axis of the lens 16 is disposed at a preset angle $(\varphi+\theta)$ relative to the vertical mid-plane of the housing 42.

Figure 9:
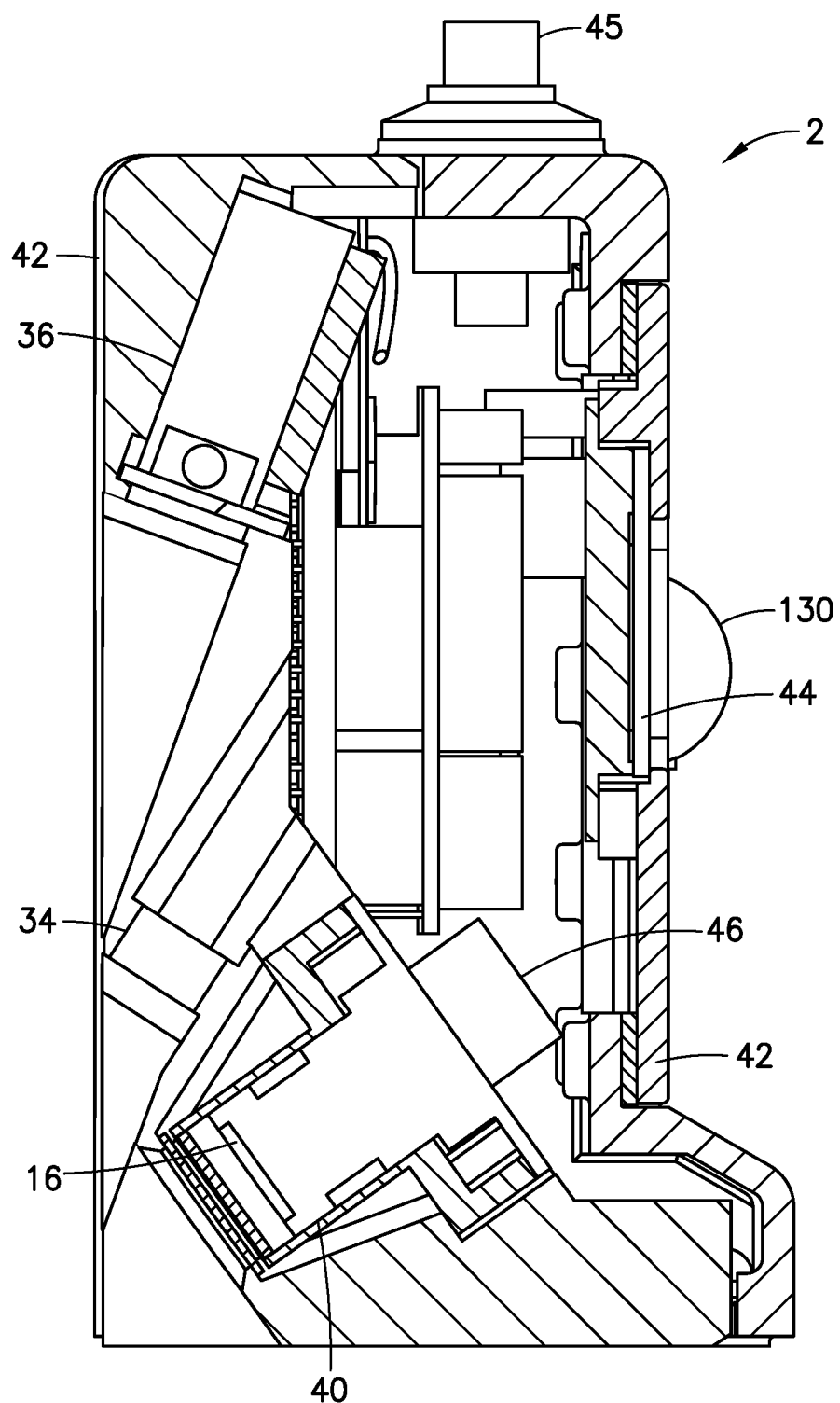
FIG. 9 is a diagram representing a partially sectional view of the sensor module depicted in FIGS. 7A and 7B.

FIG. 9 is a diagram representing a partially sectional view of the sensor module depicted in FIGS. 7A, 7B and 8. As seen in FIG. 9, the camera module 40 includes linear CCD array 46 and lens 16. The laser device 36 and camera module 40 are oriented at the respective preset angles described in the preceding paragraph and shown in FIG. 1. The LED array 4 is installed between the laser device 36 (situated above) and the camera module 40 (situated below). The laser device 36 is capable of emitting a laser line on an area of a measurement surface 8 within the field of view of the camera module 40 in a laser mode. The LED array 34 is capable of illuminating the same area of the measurement surface 8 in a flood mode.

Figure 10:
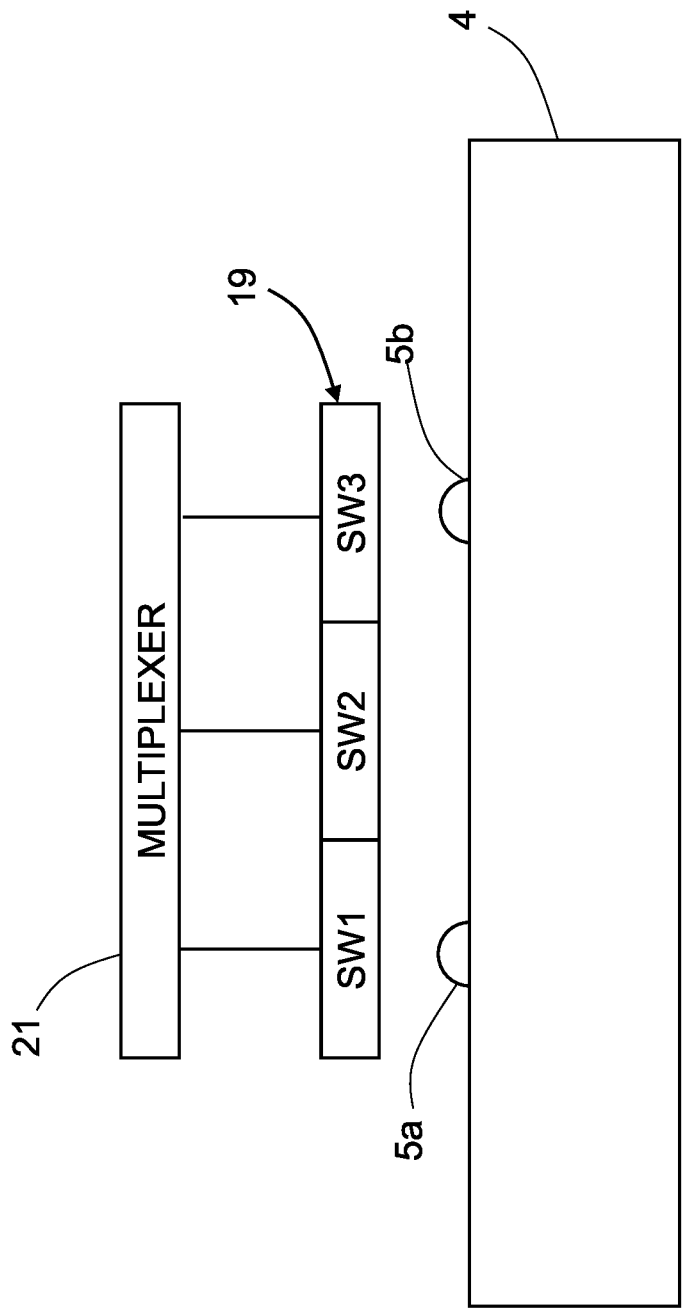
FIG. 10 is a diagram depicting physical features on a clamp and microswitches incorporated in the bottom of the sensor module for detecting the physical features on the clamp.

In accordance with an alternative embodiment of the sensor module 2, the RFID reader may be replaced by a microswitch array. FIG. 10 is a diagram depicting physical features 5a and 5b on a clamp 4 and microswitches SW1, SW2 and SW3 of a microswitch array 19 incorporated in the bottom of the sensor module 2. FIG. 10 depicts an instant in time when the sensor module 2 is not yet in contact with the clamp 4. When the sensor module 2 is placed flush on the clamp 4, the microswitch array 19 detects the physical features 5a and 5b on the clamp 4. That information will be used to identify the clamp 4. FIG. 10 presents a simple example encoding scheme in which the three microswitches SW1, SW2 and SW3 overlie respective encoding areas on the clamp when the sensor module 2 and clamp 4 are properly aligned. The encoding scheme is realized by forming or not forming physical features in the respective encoding areas depending on the identification code of the particular type of clamp being used and then using the microswitch array 19 to detect the presence of the physical features representing that identification code. In the example depicted in FIG. 10, physical feature 5a has been built on a first encoding area, physical feature 5b has been built on a third encoding area, and no physical feature has been built on a second encoding area disposed between the first and third encoding areas. The state of the outputs of the microswitches SW1, SW2 and SW3 represents a switch combination that is sent to the microcontroller 20 by way of a multiplexer 21.

In accordance with the example embodiments disclosed in some detail below, the sensor modules 2 are mounted to an aircraft 100 (e.g., see FIG. 12) for use in a control surface rigging procedure. A system comprising sensor modules and clamping assemblies mounted to an aircraft and configured to measure a position of a control surface relative to a reference position and then broadcast the measurement results will be referred to hereinafter as a "remote optical control surface indication system". The remote optical control surface indication system disclosed herein allows the user to measure the positions of control surfaces for rigging by non-contact means, thus eliminating the risk of human contact with hazardous aircraft energy.

Figure 11:
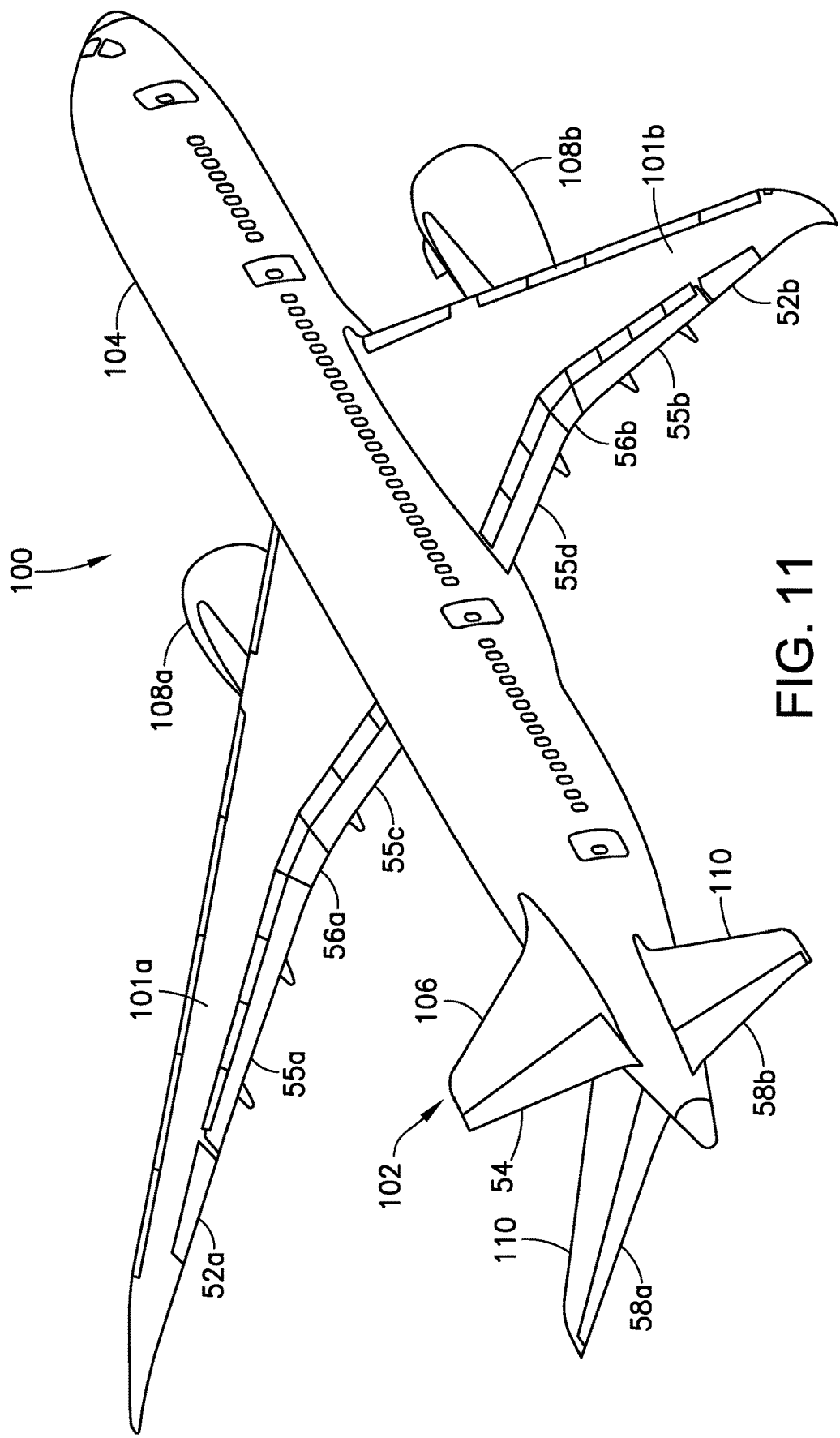
FIG. 11 is a diagram representing an isometric view of an aircraft having control surfaces which may be rigged using the apparatus disclosed herein.

FIG. 11 is a diagram representing an isometric view of an aircraft 100 having control surfaces which may be rigged using the remote optical control surface indication system disclosed herein. The aircraft 100 includes a fuselage 104, a pair of wings 101a and 101b, and an empennage 102. The aircraft 100 further includes two propulsion units 108a and 108b respectively mounted to the wings 101a and 101b.

Still referring to FIG. 11, the empennage 102 includes a vertical stabilizer 106, used to restrict side-to-side motion of the aircraft (yawing), and a rudder 54 pivotably coupled to the vertical stabilizer 106 by hinges. The rudder 54 is rotatable to provide the appropriate yawing force according to a corresponding deflection angle. The empennage 102 further includes a horizontal stabilizer 110, which is used to provide pitch stability. The rear section of the horizontal stabilizer has left-hand and right-hand elevators 58a and 58b pivotably coupled thereto by hinges. An elevator is a movable airfoil-shaped body that controls changes in pitch, i.e., the up-and-down motion of the aircraft's nose. The aircraft 100 depicted in FIG. 11 also includes one or more leading edge devices (not described in detail herein) and one or more trailing edge devices (some of which are described in some detail below) which may be extended and/or retracted to alter the lift characteristics of the wings 101a and 101b. As seen in FIG. 11, the wings 101a and 101b also include trailing edge devices located at the trailing edges of the wings. In the example depicted in FIG. 11, the trailing edge devices include left-hand and right-hand inboard flaps 55c and 55d and left-hand and right-hand outboard flaps 55a and 55b. In addition, the trailing edge devices include a left-hand flaperon 56a and a left-hand aileron 52a on the left wing 101a as well as a right-hand flaperon 56b and a right-hand aileron 52b on the right wing 101b. A flaperon is a type of control surface that combines the functions of both flaps and ailerons.

The apparatus disclosed herein, including clamping assemblies and sensor modules, may be mounted to the aircraft 100 and utilized to rig the left-hand aileron 52a, the right-hand aileron 52b, the rudder 54, the left-hand flaperon 56a, the right-hand flaperon 56b, the left-hand elevator 58a and the right-hand elevator 58b. In accordance with one proposed implementation, each sensor module 2 is mounted to a clamp that is made specific to a respective control surface location on an aircraft.

Figure 12:
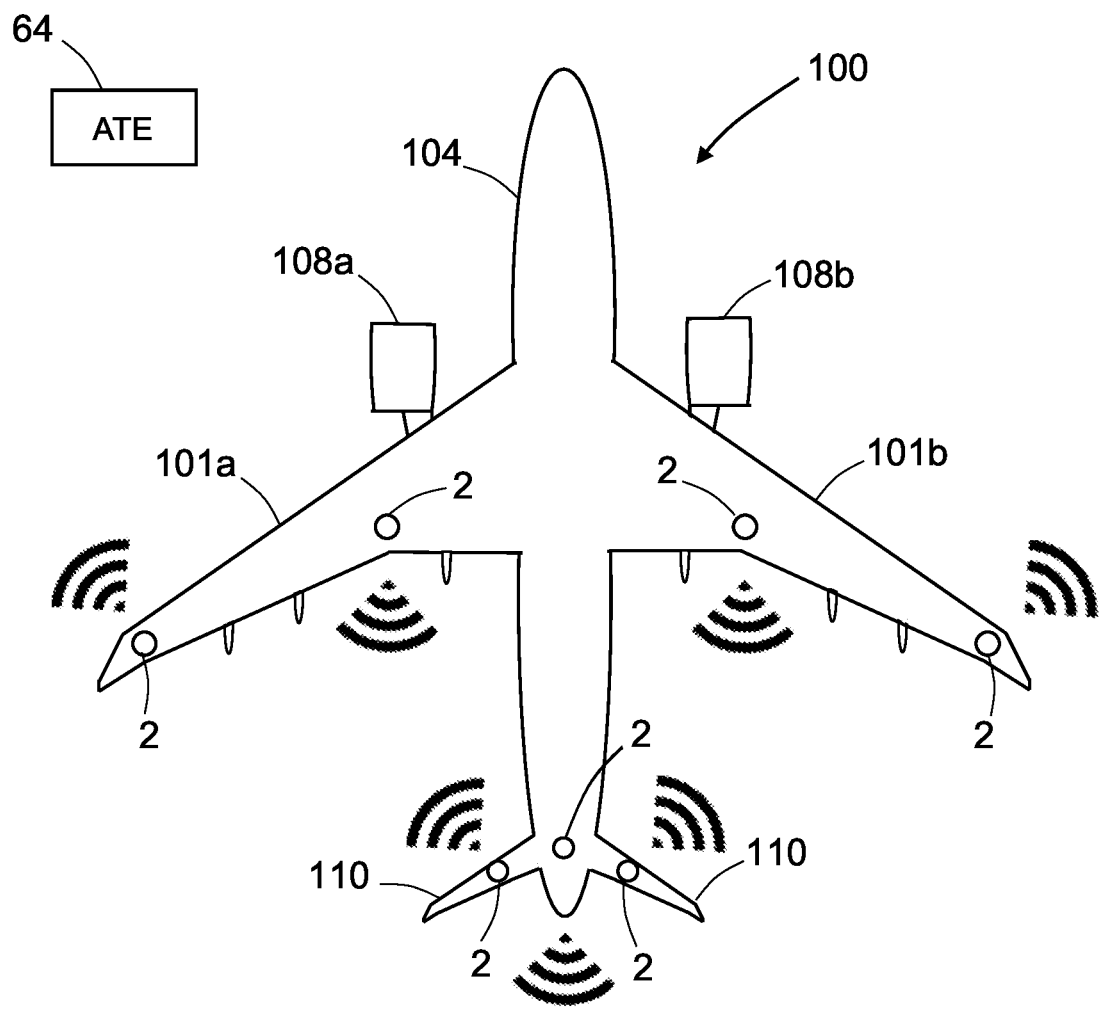
FIG. 12 is a diagram representing a plan view of a wireless network of sensor modules mounted on an aircraft.

FIG. 12 is a diagram representing a plan view of a wireless network of sensor modules 2 mounted on an aircraft 100. The sensor modules 2 are mounted to the aircraft 100 at locations where the zero positions of various control surfaces are measured during a rigging procedure. The control surface position data acquired by the sensor modules 2 is wirelessly transmitted to a data acquisition computer 62 (see FIG. 13). That information is ultimately received by automated test equipment 64 (hereinafter "ATE 64") for use in a control surface rigging procedure.

The ATE 64 includes a system controller that has a memory for storing programmed instructions that control operation of the test apparatus to automatically test the flight controls system of the aircraft 100, and for storing the resulting flight controls system test data. In addition, the apparatus includes components enabling an operator to enter information into, and output test data from, the system controller. An interface comprising the automated test apparatus connects the system controller to the aircraft flight controls system, enabling the system controller to automatically control the flight controls system in accordance with the programmed instructions, to effect the various functions of the flight controls system in order to test the flight controls system operation on the ground. In one embodiment, the ATE 64 is connected by the interface to an onboard central maintenance computer within the aircraft's flight equipment. The central maintenance computer is connected to the flight controls system of the aircraft, including a plurality of LRUs and control surface transducers. The central maintenance computer includes a non-volatile memory and is programmed to run onboard tests of the flight controls system. When connected, the system controller controls the central maintenance computer in accordance with the programmed instructions to run the onboard tests of the flight controls system, with results of the onboard tests being conveyed through the interface for storage by the system controller.

Figure 13:
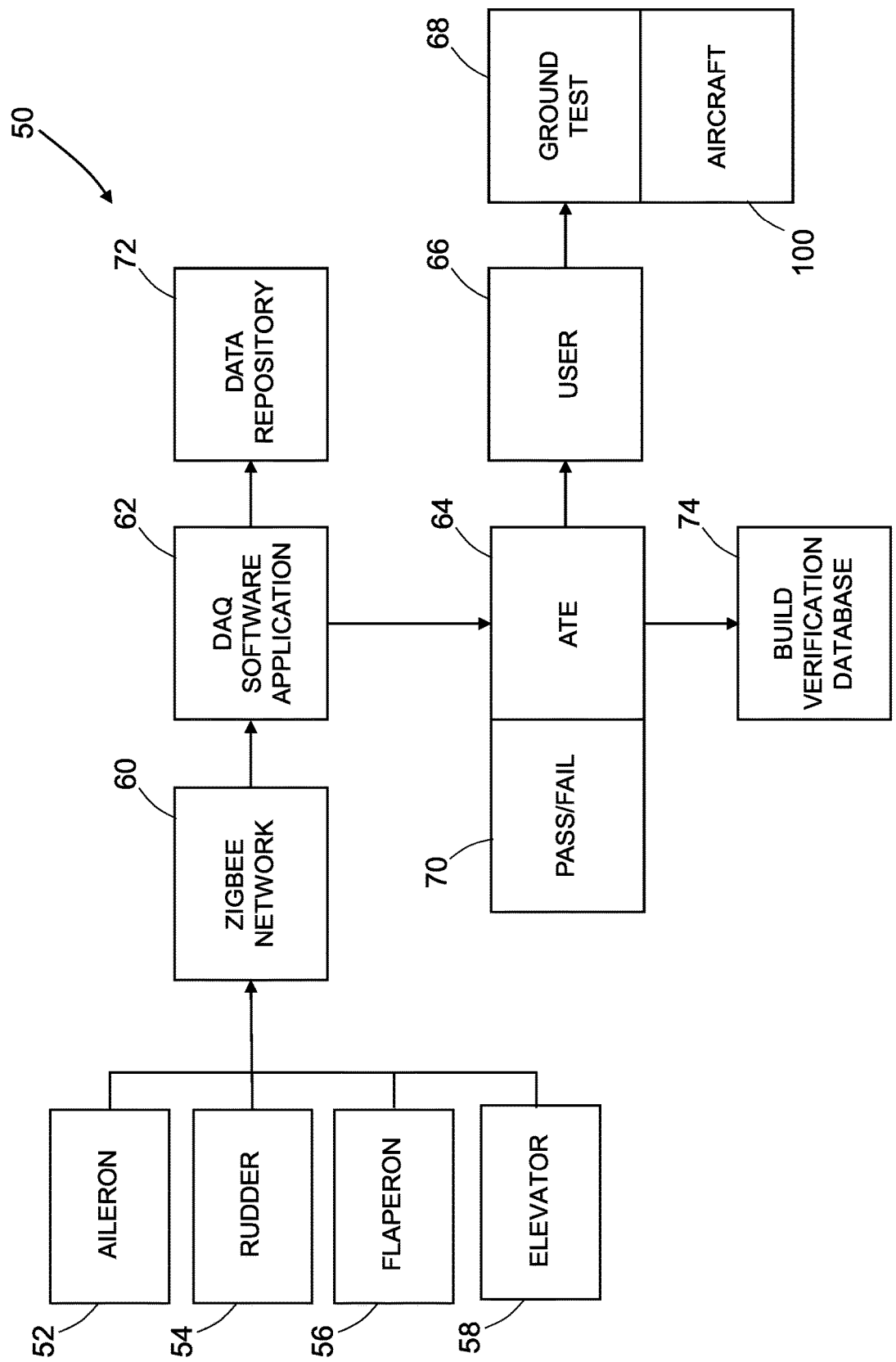
FIG. 13 is a block diagram showing the transmission of data representing measured positions of control surfaces from an aircraft to an automated test equipment (ATE) station using a wireless network.

FIG. 13 depicts the transmission of data representing measured positions of control surfaces from an aircraft to an automated test equipment (ATE) station using a wireless network. More specifically, sensor modules measure the positions of ailerons 52, rudder 54, flaperons 56 and elevators 58 and then transmit the acquired data (e.g., the object centroid data signals) to a data acquisition computer 62 via a Zigbee network 60. Zigbee is an IEEE 802.15.4-based specification for a suite of high-level communication protocols used to create close-proximity area networks with small, low-power digital radios. The object centroid data signals are received by a USB dongle which is plugged into a USB port of the data acquisition computer 62.

The data acquisition computer 62 hosts a data acquisition software application that processes the object centroid data signals received from the sensor modules 2. The raw data and processed data are stored in a data repository 72, which is a non-transitory tangible computer-readable storage medium.

The system controller of the ATE 64 is a computer configured to poll the data acquisition software application for measurements to perform a pass/fail test 70. Digital test results are stored by the system controller and may be relayed for storage in a build verification database 74 that coordinates integrated aircraft systems testing. The build verification database 74 is stored in non-transitory tangible computer-readable storage medium (e.g., a server).

Still referring to FIG. 13, the control surface rigging process is performed by a user 66 via a ground test 68, which is a computer program that is run either on the aircraft's computers or on a laptop with a connection to the aircraft. The ground test program is part of the aircraft design, and is tied into various aircraft systems. Ground tests may be run from the flight deck or from the ATE system controller. Readouts are used to adjust hydraulics during the ground test. The ground test program executes a sequence of hardware and software operations to fill and bleed the hydraulic systems, and at certain points asks the user 66 to physically zero out the position of each control surface. This is achieved through "bumps" of hydraulic actuation initiated by the user 66 from in the ground test 68. The user clicks the up and down buttons to move each control surface by small, discrete degrees of actuation until the measurement surface is as close as possible to flush (zero) with the adjacent wing surface. When this has been physically verified, the user 66 clicks another button within the ground test 68 to accept the current position as the new zero. This point is stored in the aircraft's memory, and the ground test 68 then enters into a sequence of hydraulic maneuvers that zero the control surface's other actuation devices to the new zero position.

When this is completed, the ground test 68 prompts the user 66 to move on and do the same thing to the next control surface.

Figure 14:
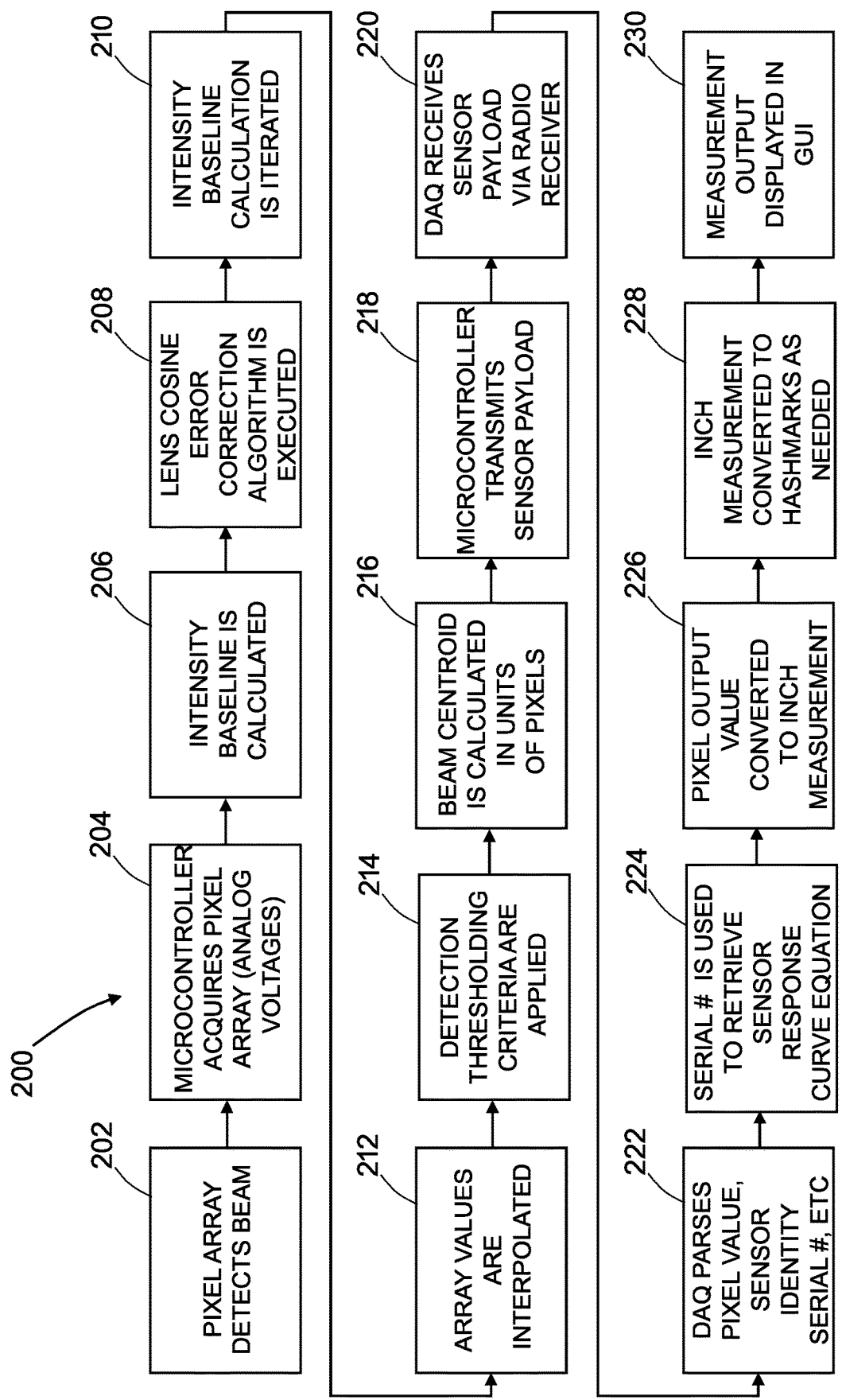
FIG. 14 is a flowchart identifying steps of a method for acquiring and displaying control surface position measurement data in accordance with one proposed implementation.

FIG. 14 is a flowchart identifying steps of a method 200 for acquiring and displaying control surface position measurement data in accordance with one proposed implementation. The linear CCD array 46 detects laser light scattered from the measurement surface and outputs an array of pixels (step 202). The microcontroller 20 acquires the pixel array, converting analog voltages to digital voltages (step 204). Then the microcontroller 20 calculates an intensity baseline (step 206), executes a lens cosine error correction algorithm (step 208), iterates the intensity baseline calculation (step 210), interpolates the pixel array values (step 212), applies detection thresholding criteria (step 214), calculates the object centroid in units of pixels (step 216), and then transmits a sensor payload that includes the object centroid data (step 218). The sensor payload is received by the data acquisition computer 62 via radio receiver (step 220). The data acquisition computer 62 parses pixel value, sensor identity, serial number, etc. (step 222). The serial number is used to retrieve the appropriate sensor response curve equation for the identified control surface (step 224). Then the data acquisition computer 62 converts the pixel output value to an inch measurement (step 226), converts the inch measurement to hashmarks as needed (step 228), and displays the measurement output in a graphical user interface (step 230).

Interpolation artificially increases the measurement resolution into the sub-pixel regime. This is done under the assumption that the measurement surface is smooth and flat enough at small scales so that one can safely make up pixel intensity values and insert them between the existing ones. This is done by simple averaging between nearest neighboring pixel intensity values.

As used herein, a hashmark refers to a particular degree of flight control surface movement at the hydraulic actuator. Specifically, a hashmark is a linear measurement at the trailing edge of the control surface corresponding to 0.05 degree of rotational movement at the actuator. This definition is tied to the aerodynamic requirements of the aircraft, and hashmarks form the basis for rigging requirements. Not all rigging requirements are explicitly written on the basis of hashmarks, but in cases where hashmarks are used, the units of control surface movement are converted from inch measurements to hashmarks. The DAQ computer 62 first calculates the measurement in terms of inches and then translates the output into hashmarks.

Figure 15:
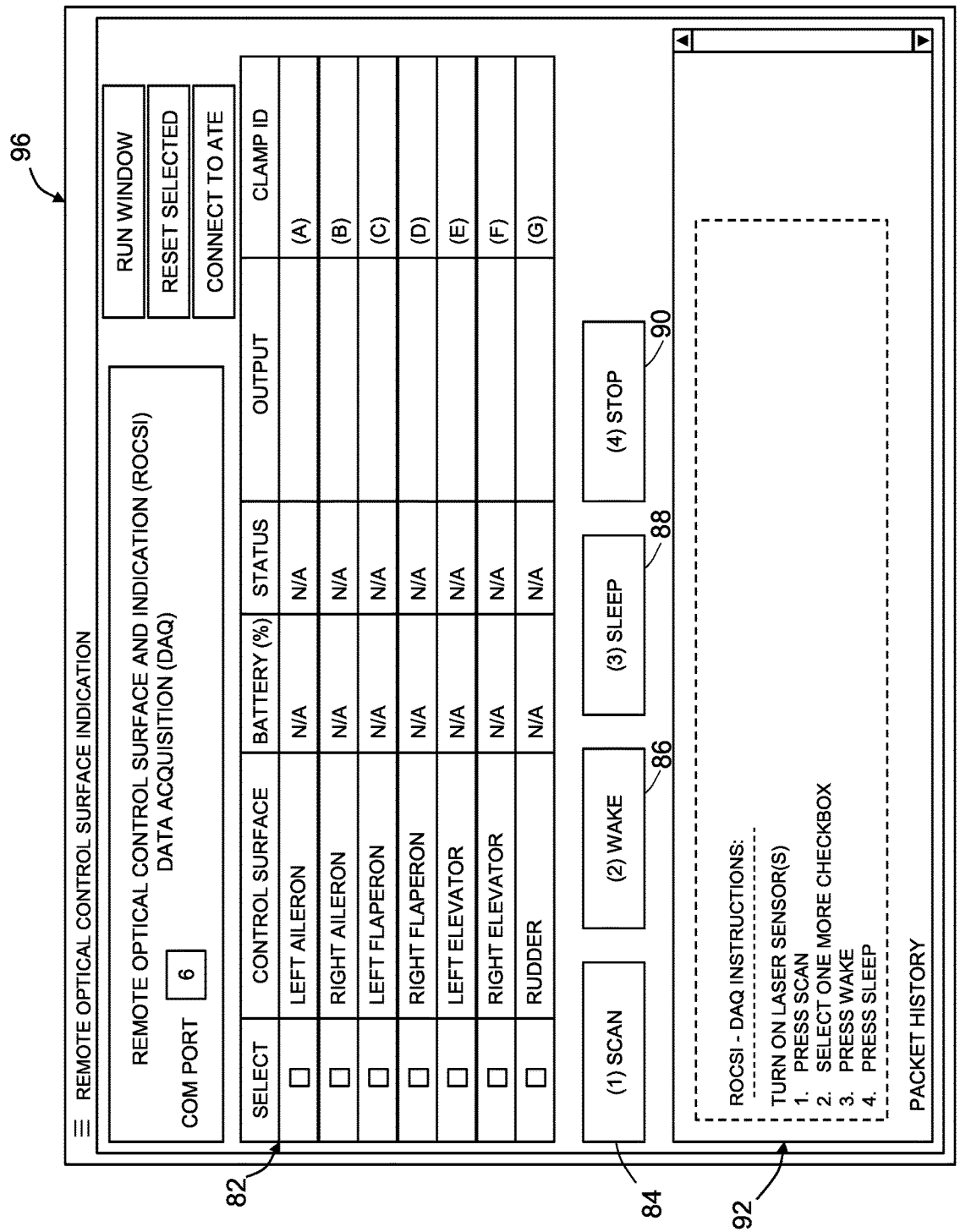
FIG. 15 is a diagram showing a graphical user interface being presented on the display screen of a data acquisition computer in accordance with one embodiment.

FIG. 15 is a diagram showing a graphical user interface 80 being presented on the display screen 96 of the data acquisition computer 62. The graphical user interface 80 includes a menu 82 having a number of columns. The CONTROL SURFACE column lists the names of the control surfaces involved in the rigging procedure. The system operator may select any one of the control surfaces for rigging by clicking on the associated field in the row that names the control surface to be selected. The CLAMP ID column lists the respective ID code for each of the listed control surfaces. The instructions for initiating a data acquisition for a selected control surface are visible in a window 92. The system operator may scroll down to see additional information in window 92.

The process for initiating a data acquisition includes selecting a control surface to be rigged by clicking on a field in the SELECT column of menu 82 and then turning on the sensor module associated with the selected control surface by touching a SCAN virtual button 84. The selected sensor module is then awakened by touching a WAKE virtual button 86. The same sensor module may be switched to the sleep mode by touching a SLEEP virtual button 88. The rigging procedure may be terminated by touching a STOP virtual button 90.

The rigging methods disclosed in detail herein may be used to calibrate ailerons, flaperons, elevators, rudders and other types of control surfaces by optically detecting the position of a measurement surface relative to a reference position. In some cases, the measurement surface is movable and the reference surface (to which the sensor module is clamped) is fixed; in other cases, the measurement surface is fixed and the reference surface is movable.

Figure 16:
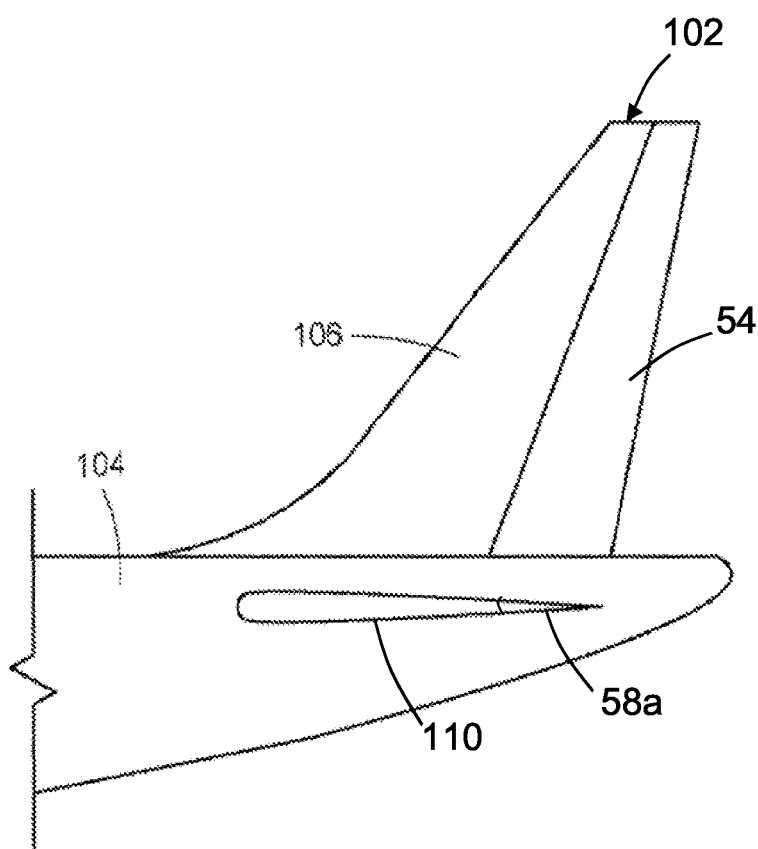
FIG. 16 is a diagram representing a side view of an empennage of a typical aircraft.

For the sake of illustration, a process for rigging a rudder will be described in some detail. FIG. 16 shows the structure of a typical empennage 102 of an aircraft. The vertical tailfin of the typical empennage 102 includes fixed front section called the vertical stabilizer 106, used to restrict side-to-side motion of the aircraft (yawing). The vertical stabilizer 106 is attached to the top of a rear portion of the fuselage 104. The rear section of the vertical tailfin typically has a rudder 54 pivotably coupled to vertical stabilizer 106 by hinges. The rudder 54 is rotatable to provide the appropriate yawing force according to a corresponding deflection angle. The typical empennage 102 depicted in FIG. 13 further comprises a horizontal stabilizer 110, which is used to provide pitch stability. The rear section of the horizontal stabilizer 110 typically has elevators 58*a* and 58*b* pivotably coupled to the horizontal stabilizer 110 by hinges (only elevator 58*a* is visible in FIG. 16). An elevator is a movable airfoil-shaped body that controls changes in pitch, i.e., the up-and-down motion of the aircraft's nose.

Various rigging methods may be employed to calibrate the rudder 54 relative to the rudder controls operated by the aircraft pilot. Calibration establishes the correct relationship by aligning a feature of the rudder (e.g., a centerline) with a feature (e.g., an alignment indexing plate comprising a plurality of linear measurement markings) on the rear portion of the fuselage 104. [Similar features (e.g., alignment indexing plates) may be used to calibrate the elevators 58*a* and 58*b* relative to the elevator controls operated by the aircraft pilot.] By rotating the rudder 54 to a target relationship relative to the fuselage 104, the location of the rudder feature may be calibrated relative to the rudder controls. In this manner, the rudder controls may be rigged to accurately reflect the true position of the rudder to improve aircraft performance.

Figure 17:
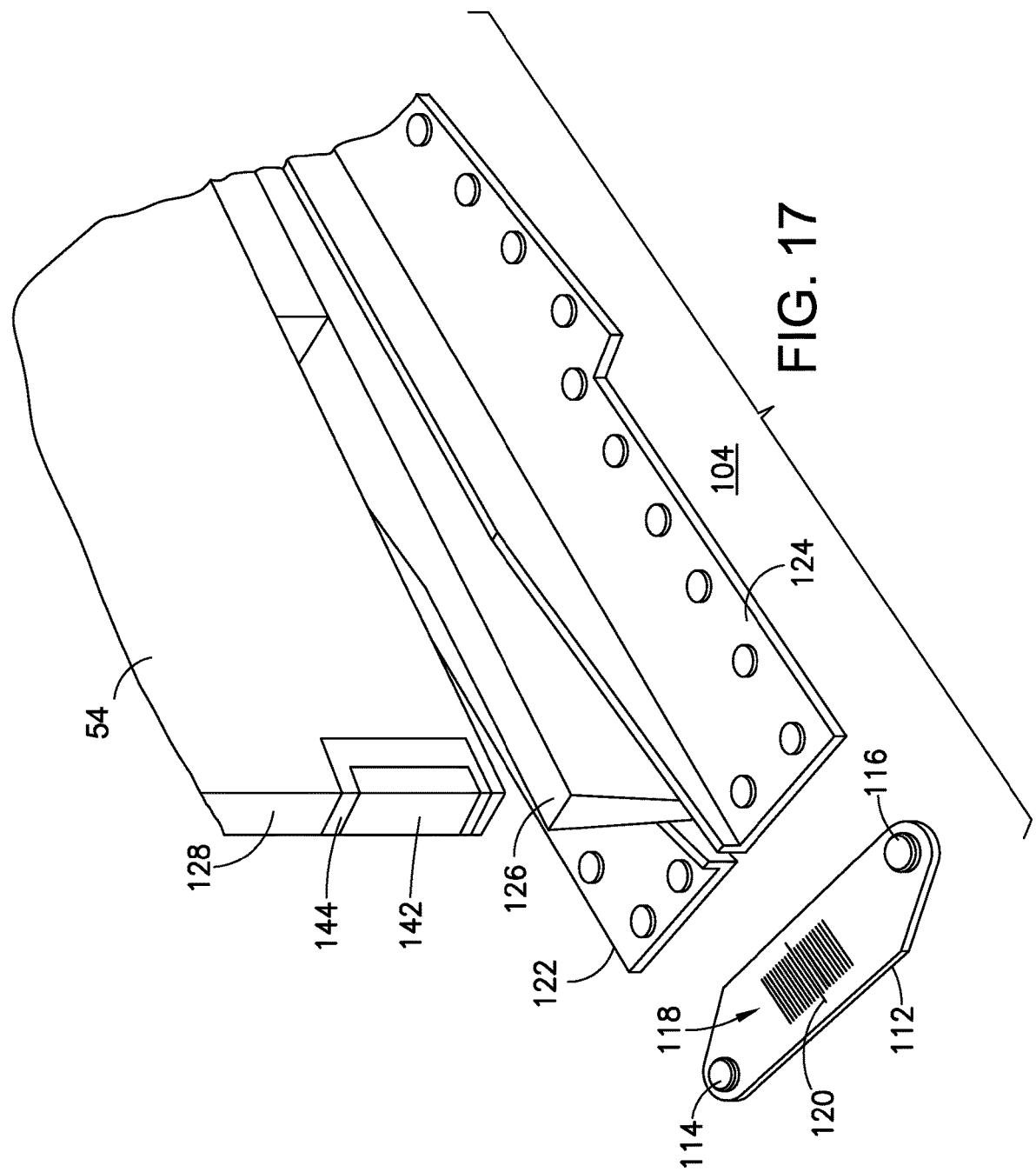
FIG. 17 is a diagram representing an isometric view of a portion of an empennage having an alignment indexing plate attached to the fuselage.

FIG. 17 represents an isometric view of a portion of an empennage having an alignment indexing plate 112 attached to the top of the rear portion of the fuselage 104 aft of the vertical tail assembly. The vertical tail assembly comprises a vertical stabilizer fairing 126 attached to the rear portion of the fuselage 104 by a pair of L-beams 122 and 124 and disposed directly below the rudder 54 when the latter is in its neutral position, i.e., a deflection angle of zero degrees. The rudder 54 has a large bulb seal (not shown in FIG. 14) mounted underneath which rides on top of the vertical stabilizer fairing 126 for aerodynamic purposes.

The alignment indexing plate 112 is attached at a specified position using a pair of indexing plate fasteners 114 and 116. The indexing plate fasteners 114 and 116 are considered reference geometry on the aircraft and are precisely located. The alignment indexing plate 112 has a plurality of linear measurement markings 118 thereon which are spaced apart at equal intervals in the manner of a ruler. The alignment indexing plate 112 is positioned relative to the vertical stabilizer fairing 126 such that a centerline of the rudder 54 will be aligned with an aircraft butt line marking 120 of the plurality of linear measurement markings 118 when the rudder 54 is in its neutral position.

One known rudder rigging tool is a heavy block of aluminum (not shown in FIG. 17) that is clamped onto the trailing edge 128 of the rudder 54. The block has a steel pin (not shown) which points to the alignment indexing plate 112. The rudder 54 can be properly calibrated when the point of the steel pin overlies the aircraft butt line marking 120 on the alignment indexing plate 112. This technique may present a potential for observational error beyond the design requirement. In addition, the known rudder rigging tool must be read at a close distance. This requires a maintenance technician to spend time acquiring and setting up a laptop and webcam system in order to comply with a five-foot hazardous energy rule with regard to active control surfaces. The rudder rigging tool then remains attached while the rudder is swung in factory testing, presenting a potential risk of detachment.

In accordance with the rudder rigging technique disclosed herein, a sensor module 2 (not shown in FIG. 17, but see FIG. 19) may be clamped to the aircraft 100 and utilized to indicate the position of a rudder 54 that has an optical target on the trailing edge 128. In accordance with one embodiment depicted in FIG. 13, that optical target may take the form of a reflective tape 142 adhered to an underlying contact tape 144 that is approved by the factory for contact with the skin of the rudder 54. In this implementation, the sensor module 2 is operated in a flood mode and the microcontroller 20 measures the position of a centerline located between the edges of the optical target in the manner disclosed in U.S. Pat. No. 10,475,173), the disclosure of which is incorporated by reference herein in its entirety.

Figure 18:
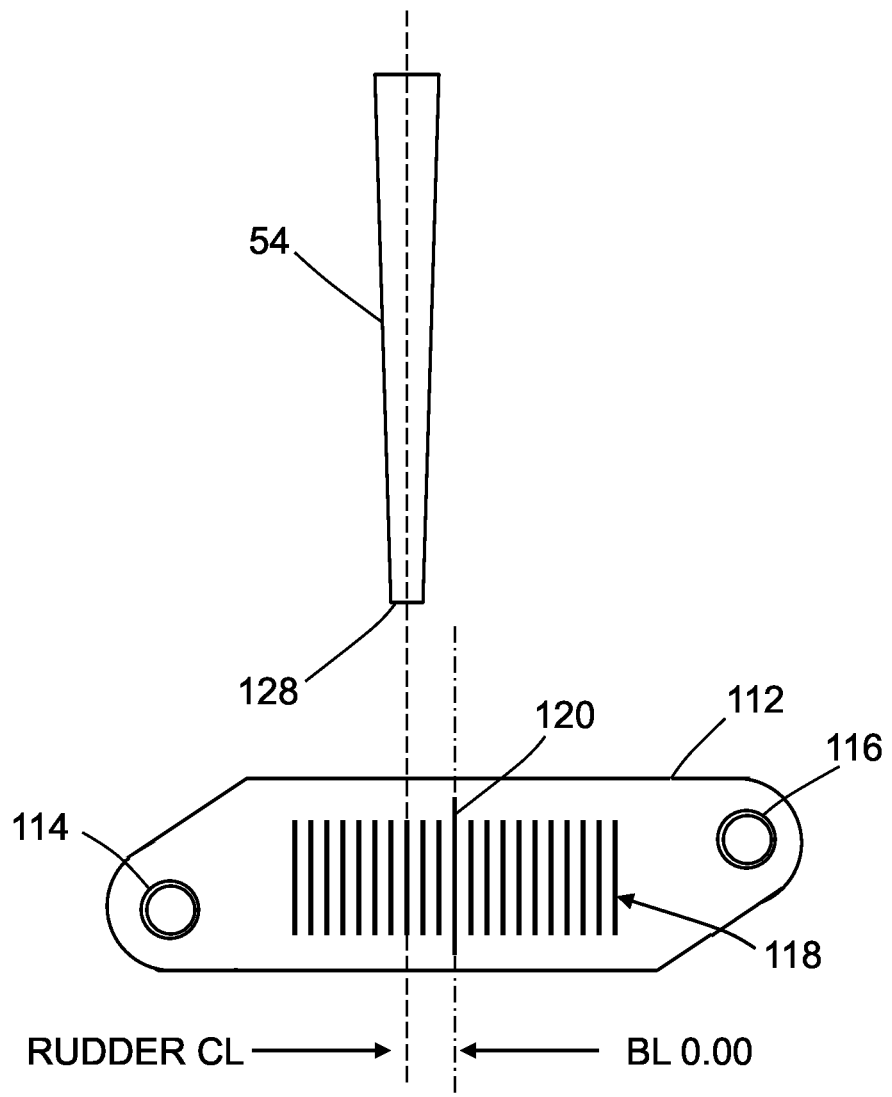
FIG. 18 is a diagram representing a top view of a rudder having a non-neutral position relative to an alignment indexing plate attached to the fuselage.

FIG. 18 represents a top view of a rudder 54 having a non-neutral position relative to an alignment indexing plate 112 attached to the rear portion of the fuselage 104. Specifically, the dashed line labeled RUDDER CL in FIG. 18 indicates the position of the centerline of the rudder 54 relative to the position of the aircraft butt line marking 120, which position is represented by the dashed-dotted line labeled BL 0.00. This linear position of the rudder centerline in relation to the aircraft butt line is used as an approximation of the angular deflection of the rudder 54 at small angles close to the neutral position at BL 0.00. When the centerline of rudder 54 aligns with the aircraft butt line marking 120 during a rudder rigging operation, the maintenance technician on the flight deck can calibrate the rudder controls to indicate that the rudder 54 has a deflection angle of zero degrees.

Figure 19:
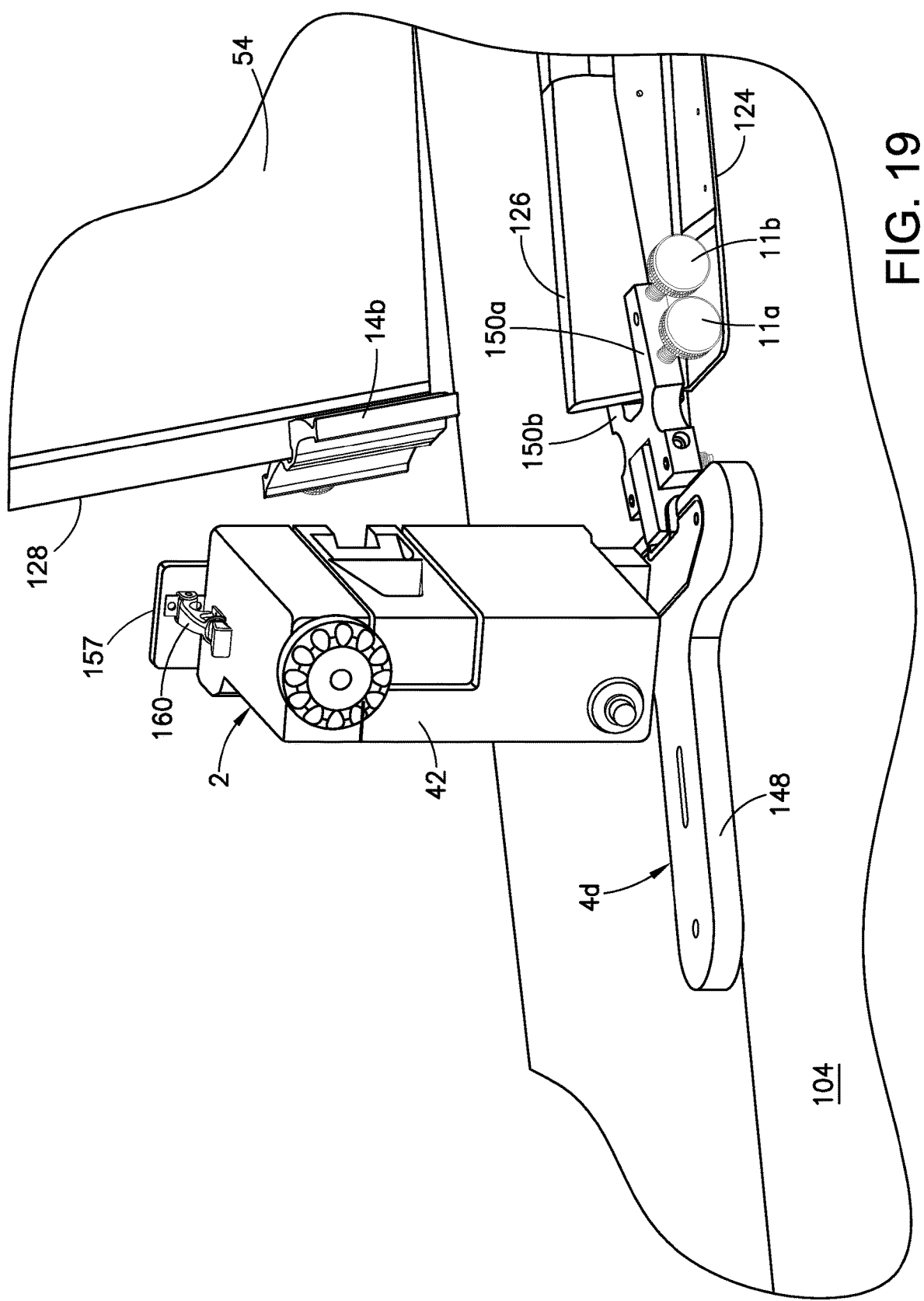
FIG. 19 is a diagram representing a three-dimensional view of a remote optical control surface indication system configured (in a flood mode) and installed for measuring a position of a rudder relative to an alignment indexing plate attached to the fuselage in accordance with one embodiment.

FIG. 19 is a diagram representing a three-dimensional view of a remote optical control surface indication system configured (in a flood mode) and installed for measuring a position of a rudder 54 relative to the alignment indexing plate 112 shown in FIG. 18. The sensor module 2 is attached to a clamp 4d that is specially configured for holding the sensor module 2 in a fixed position relative to the rudder 54 of the aircraft 100. In this example, an optical target 146 (of the type disclosed in U.S. Pat. No. 10,475,173) is attached to the trailing edge 128 of rudder 54. The optical target 146 includes a reflector and a pair of wings made of opaque material disposed on opposite sides of the reflector as described in detail in U.S. Pat. No. 10,475,173. The sensor module 2 is used to calibrate the zero position of the rudder 54 to corresponding positions of rudder pedals used by the pilot to control the direction (left or right) of yaw about the airplane's vertical axis for minor adjustments. The remote optical control surface indication system does not contact the moving rudder 54 and is attached securely to the vertical stabilizer fairing 126, indexed to the alignment indexing plate 112 shown in FIG. 18.

The clamp 4d depicted in FIG. 19 includes: a rudder clamp base 148 that is aligned with alignment indexing plate 112; a pair of rudder clamp arms 150a and 150b which are clamped to the vertical stabilizer fairing 126 by tightening a pair of thumbscrews 11 having plastic tips; and a rudder clamp block 151 to which the sensor module 2 is latched. The rudder clamp base 148, rudder clamp arms 150a and 150b, and rudder clamp block 151 form a rigid support structure designed to hold the sensor module at a specific location (including position and orientation) relative to the vertical stabilizer fairing 126 for measuring the angular position of the rudder 54. Other arrangements for calibrating the zero positions of ailerons, flaperons and elevators are described in some detail below.

The clamp 4d is placed on the rear portion of the fuselage 104 in a position that overlies and is fixed relative to the aforementioned alignment indexing plate 112. The rudder clamp base 148 comprises a pair of locating mechanisms (not shown in the drawings) which sit on the respective indexing plate fasteners 114 and 116 seen in FIG. 18. In one implementation, the locating mechanisms are drill bushings set rigidly in the rudder clamp base 148 that interface with the heads of the indexing plate fasteners 114 and 116. When the drill bushings respectively engage the heads of the indexing plate fasteners 114 and 116, the sensor module 2 is thereby located with respect to alignment indexing plate 112 to a certain degree of precision and repeatability. When the rudder clamp base 148 is properly seated on indexing plate fasteners 114 and 116, the maintenance technician knows the precise location of the sensor module 2 relative to the aircraft. More specifically, the precise location (i.e., position and orientation) of the sensor module 2 relative to the axis of rotation of the rudder 54 and relative to the centerline of the rudder 54 when it is in its neutral position (i.e., when the rudder centerline overlaps the baseline BL 0.00 seen in FIG. 18) are known.

Figure 20:
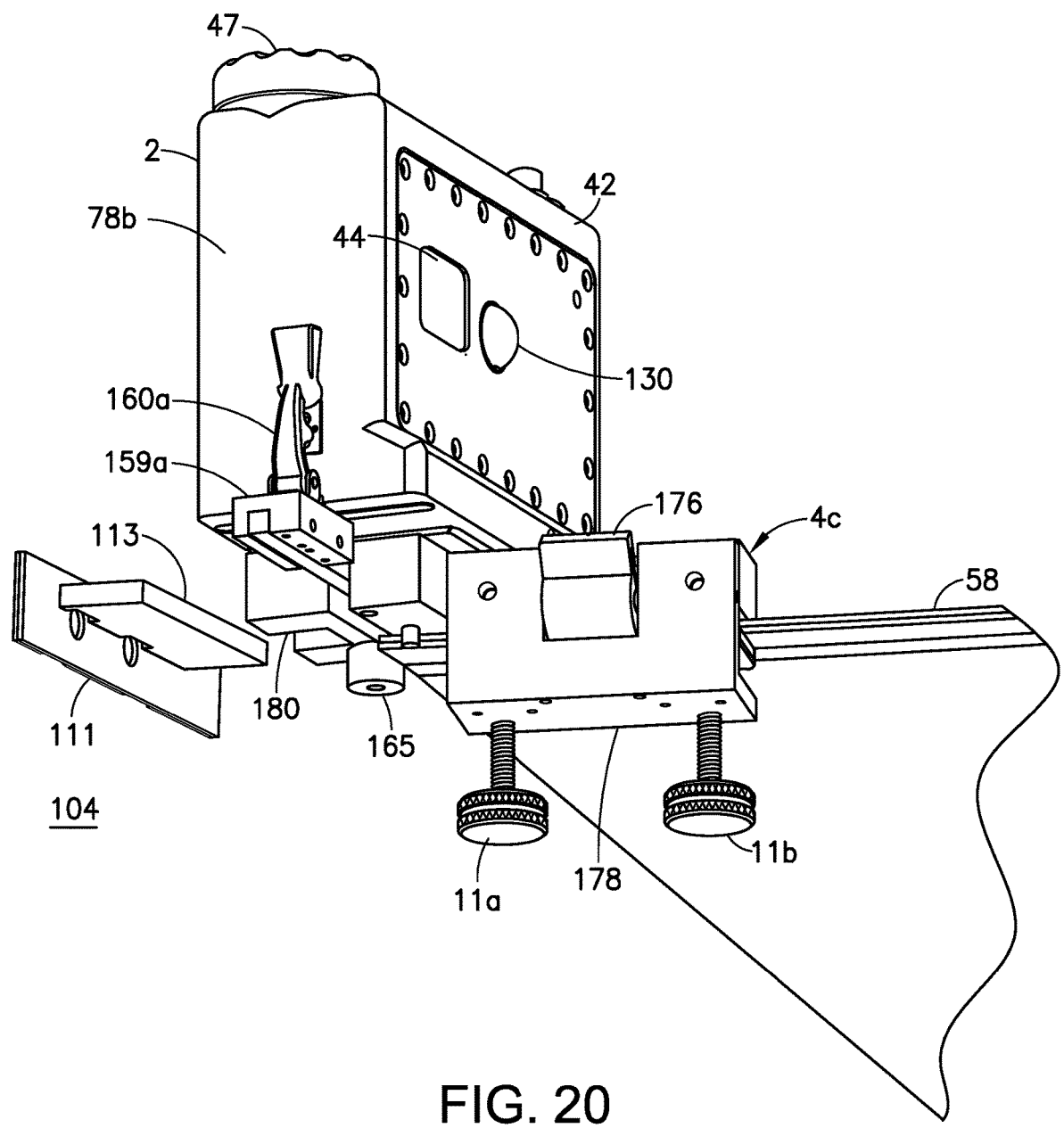
FIG. 20 is a diagram representing a three-dimensional view of a remote optical control surface indication system configured (in a laser mode) and installed for measuring a position of an elevator relative to an alignment indexing plate attached to the fuselage in accordance with another embodiment.

FIG. 20 is a diagram representing a three-dimensional view of a remote optical control surface indication system configured (in a laser mode) and installed for measuring a position of an elevator 58 relative to an alignment indexing plate 111 attached to the fuselage 104 in accordance with another embodiment. A sensor module 2 is latched to an elevator clamp 4c. The elevator clamp 4c includes an elevator clamp arm 178 that is clamped to a trailing edge of the elevator 58 (using a pair of thumbscrews 11a and 11b) and an elevator clamp block 180 that supports the sensor module 2. The sensor module 2 is held in place on the elevator clamp block 180 by a pair of draw latches (only draw latch 160a is visible in FIG. 20). As seen in FIG. 20, the draw latch 160a is pivotably coupled to an anchor bracket. The other draw latch is also pivotably coupled to an anchor bracket (not visible in FIG. 20). The elevator clamp 4c further includes an indexing pin 165 which is used to place the elevator clamp 4c in a specified position relative to the elevator 58. Other indexing pins are not visible in FIG. 20. The elevator clamp 4c further includes an indicator flag 176 which indicates whether the elevator clamp 4c has been moved subsequent to installation on the trailing edge of the elevator 58.

In the rigging scenario depicted in FIG. 20, an optical target 113 is placed on an alignment indexing plate 111 that is attached to a side of the fuselage 104 in proximity to the trailing edge of the elevator 58. The alignment indexing plate 111 indicates the zero position of the elevator 58. The optical target 113 is a lightweight plastic assembly that has holes to index with the fasteners that attach the alignment indexing plate 111 to the fuselage 104. The planar upper surface of the optical target 113 is on a plane flush with the center mark (zero position) on the alignment indexing plate 111, and the laser line from the sensor module 2 impinges onto that upper surface.

Figure 21:
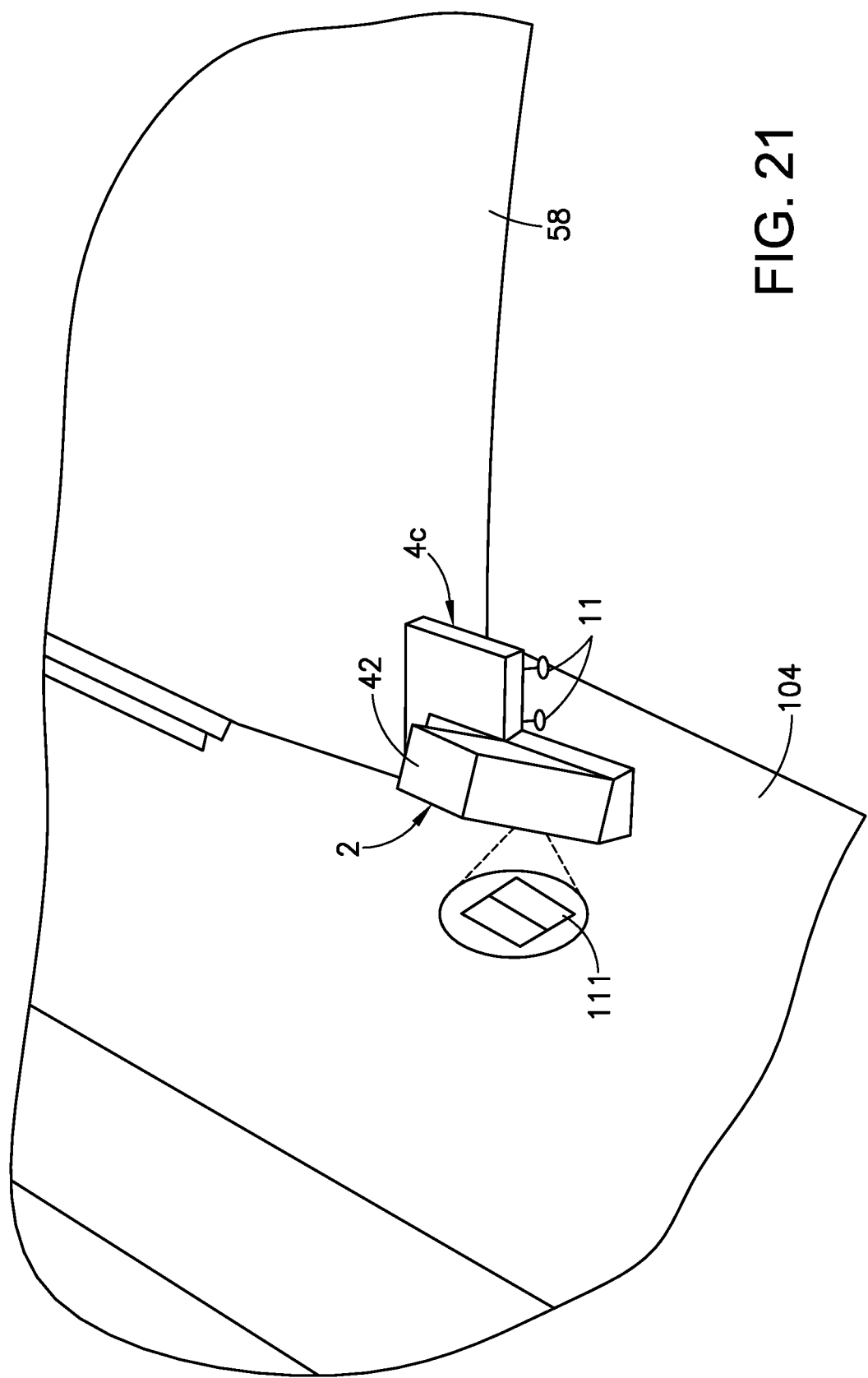
FIG. 21 is a diagram representing a three-dimensional view of a remote optical control surface indication system configured (in a flood mode) and installed for measuring a position of an elevator relative to an alignment indexing plate attached to the fuselage in accordance with a further embodiment.

FIG. 21 is a diagram representing a three-dimensional view of a remote optical control surface indication system configured (in a flood mode) and installed for measuring a position of an elevator 58 relative to the alignment indexing plate 111 in accordance with an alternative implementation. In this case the LED array inside the sensor module is activated to flood the alignment indexing plate 111 and adjacent areas with light and then the object centroid corresponding to the light absorbed by the center line of the alignment indexing plate 111 is detected to determine when the elevator 58 is in its zero position.

It should be noted that in the implementations depicted in FIGS. 20 and 21, the sensor module and clamp assembly are affixed to a moving control surface, namely, elevator 58 (in other words, the reference surface is moving and the measurement surface is stationary). In other implementations described below, the sensor module and clamp assembly are affixed to a stationary part of the aircraft (in other words, the reference surface is stationary and the measurement surface is moving).

More specifically, respective clamps are installed on the aircraft for measuring the zero position of the left and right ailerons 52*a* and 52*b* and the left and right flaperons 56*a* and 56*b* seen in FIG. 11. The clamps may be installed onto the aircraft either before or after the sensor modules are attached to the clamps. Clamps are labeled by control surface and by letter code, where A=left aileron, B=right aileron, C=left flaperon, and D=right flaperon.

Any sensor module 2 may be attached to any clamp 4 before or after the sensor module 2 is powered on, and the clamps 4 may be attached to the aircraft either before or after the sensor modules 2 are attached to the clamps 4. To attach the sensor module 2, seat the rubber draw latches 160 into their respective catches 33 one by one. The two alignment features will index to two holes in the bottom of the sensor module 2.

To turn a sensor module on, the inspection technician depresses the main power button. After the microcontroller has booted for several seconds, the LED and the LCD screen become illuminated. Whenever a sensor is placed on a clamp, whether powered on before or after attachment, the sensor will automatically begin a countdown and enter into sleep mode by default. The sensor will not be ready for measurement until the wake command is sent by the DAQ.

Figure 22:
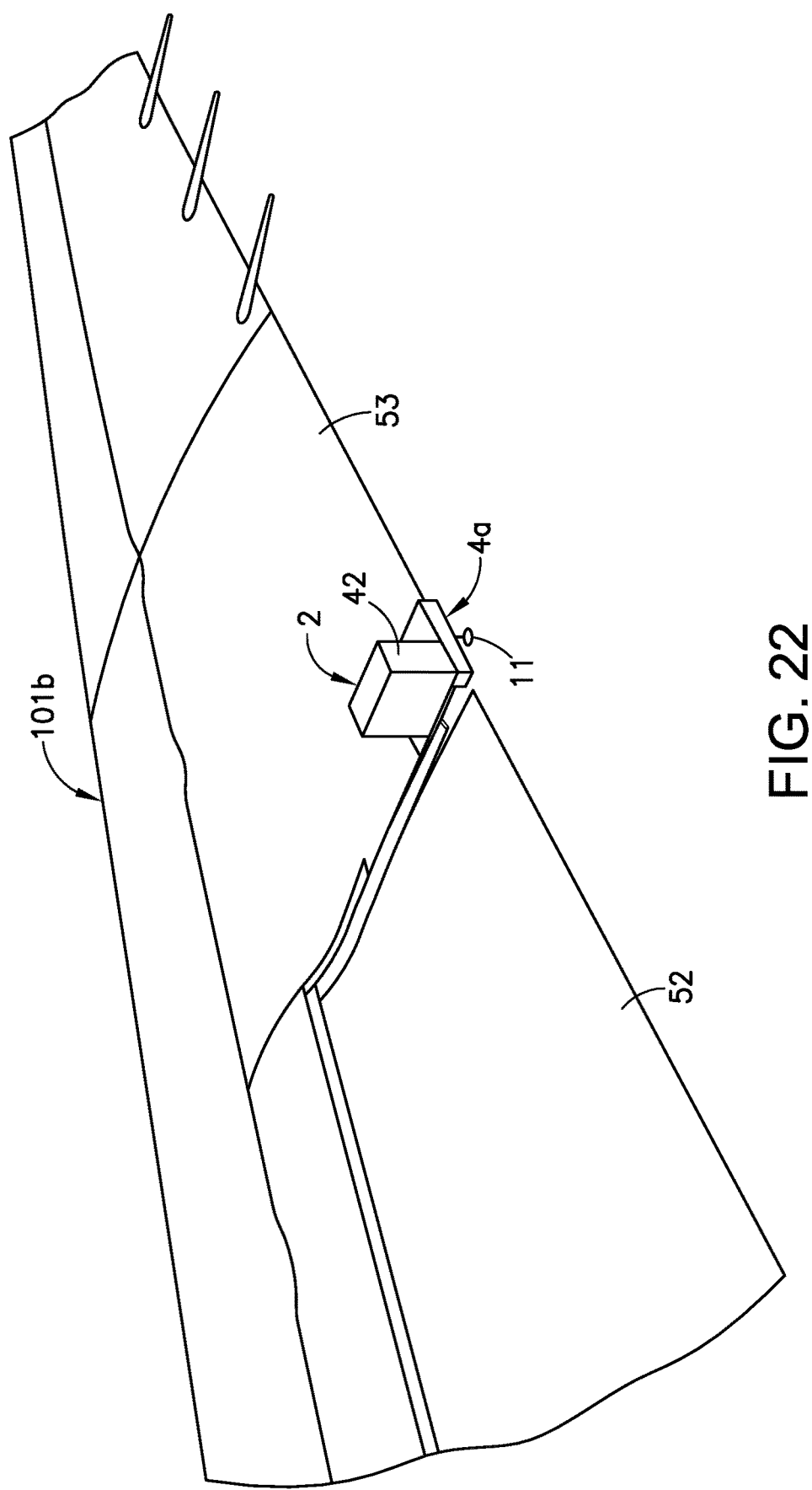
FIG. 22 is a diagram representing a three-dimensional view of a remote optical control surface indication system configured (in a laser mode) and installed for measuring a position of an aileron relative to a fixed trailing edge of a wing in accordance with yet another embodiment.

FIG. 22 is a diagram representing a three-dimensional view of a remote optical control surface indication system configured (in a laser mode) and installed for measuring a position of an aileron 52 relative to a fixed trailing edge 53 of a wing 101*b* in accordance with yet another embodiment. A sensor module 2 is latched to an aileron clamp 4*a*, which is in turn clamped to the trailing edge 53 of wing 101*b* by thumbscrews 11 (only one thumbscrew is visible in FIG. 22).

Figure 23A:
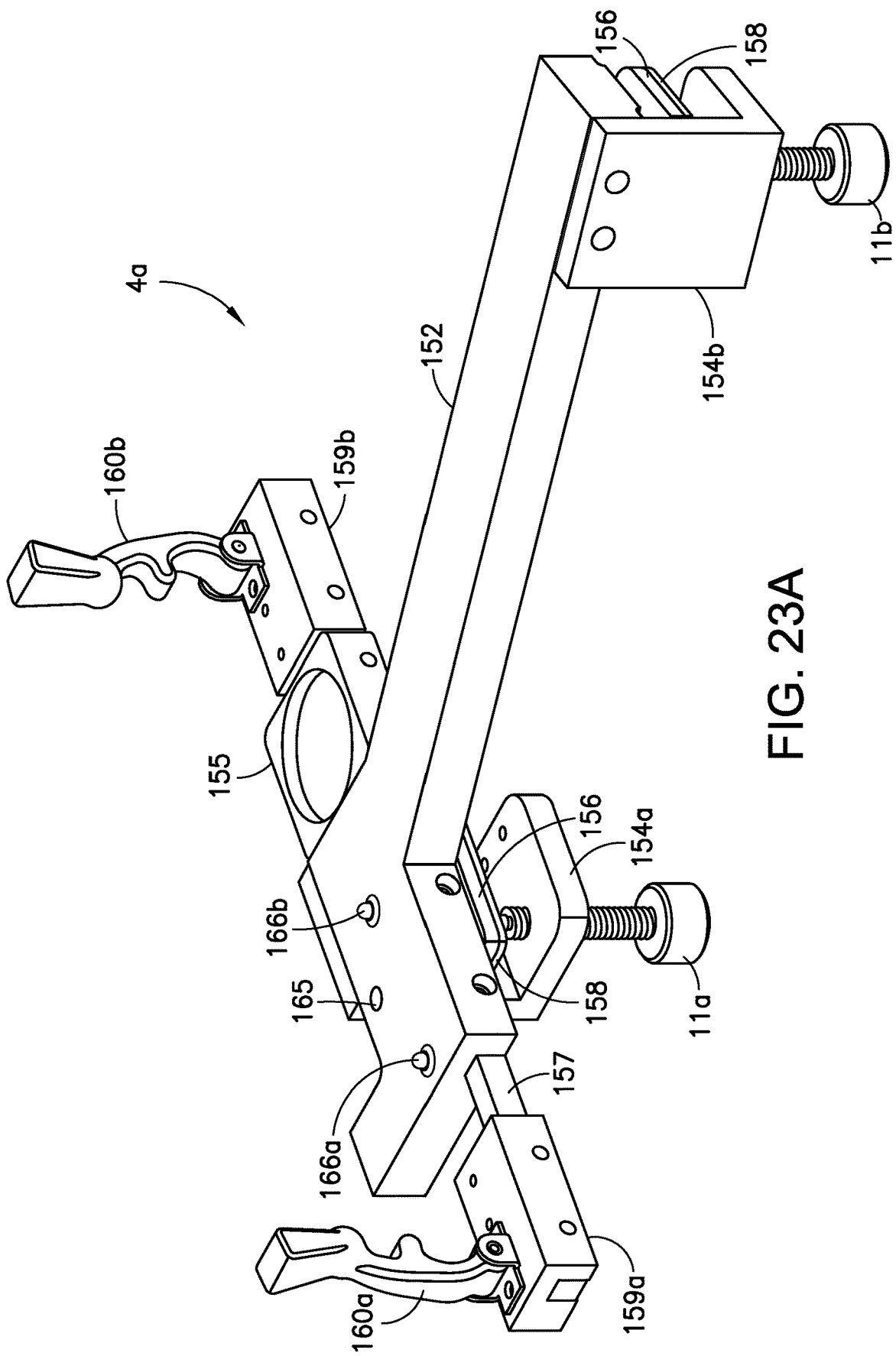
FIGS. 23A and 23B are diagrams representing top and bottom three-dimensional views respectively of a left-hand (LH) aileron clamp in accordance with one proposed implementation.
Figure 23B:
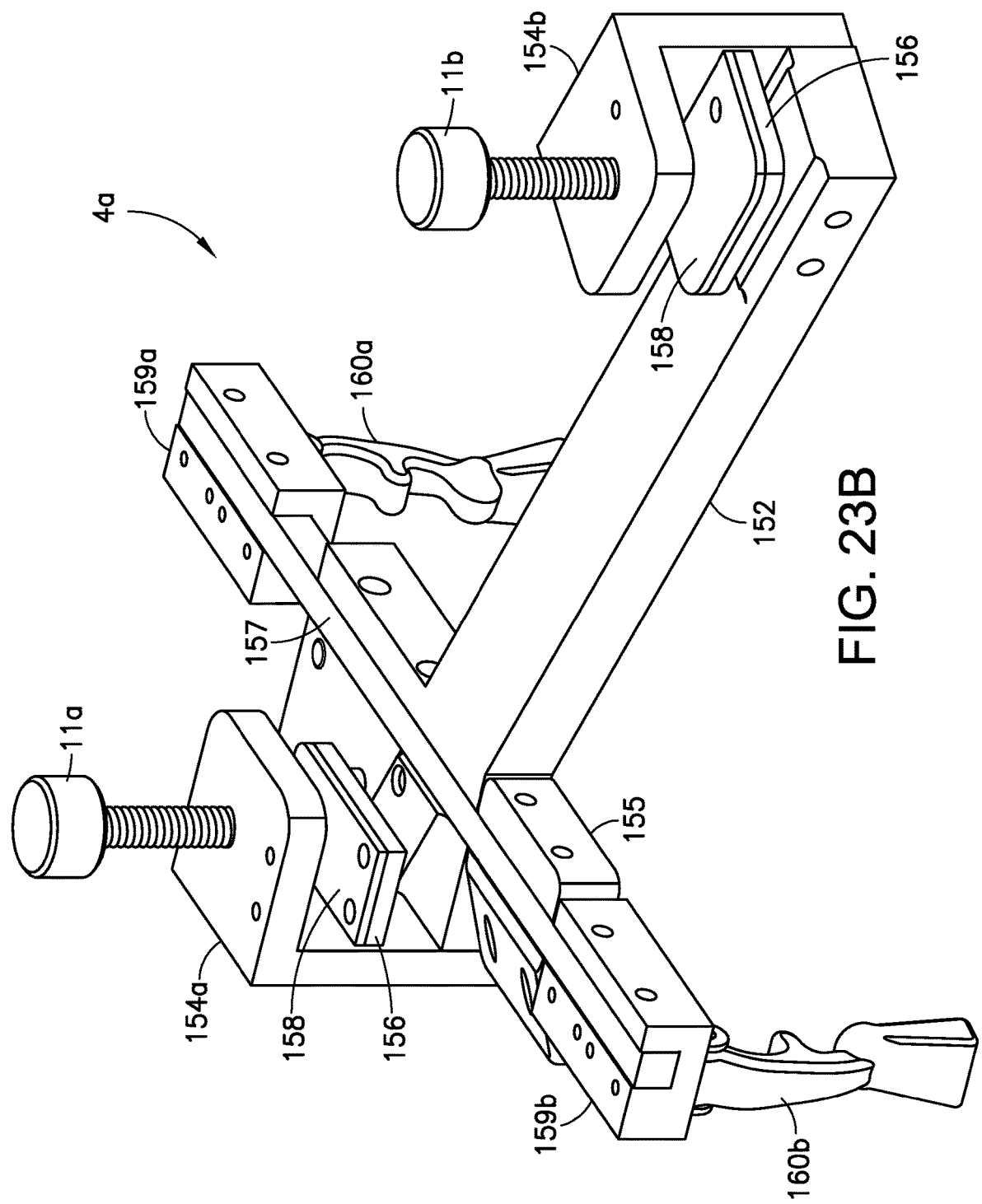

FIGS. 23A and 23B are diagrams representing top and bottom three-dimensional views respectively of an aileron clamp 4*a* in accordance with one proposed implementation. This view shows a left-hand aileron clamp, but the right-hand aileron clamp depicted in FIG. 22 is similar in construction to the left-hand aileron clamp shown in FIGS. 23A and 23B. (More specifically, the clamp block is a mirror image, but the clamp assembly is asymmetrical because the sensor is asymmetrical with a long end and a short end.) In either case, the aileron clamp 4*a* is an assembly that includes an aileron clamp block 152, an inboard aileron clamp arm 154*a* and an outboard aileron clamp arm 154*b* (hereinafter "aileron clamp arms 154*a* and 154*b*"). The aileron clamp arms 154*a* and 154*b* are rigidly coupled to the aileron clamp block 152. The aileron clamp arms 154*a* and 154*b* are made of metal. for example, aluminum. The aileron clamp block 152 is made of polymeric material, for example, DuPont™ Delrin® acetal resin, which is lightweight and can be machined to tight tolerances.

Each of the aileron clamp arms 154*a* and 154*b* has a threaded bore which threadably engages the threaded shaft of respective thumbscrews 11*a* and 11*b*. Each of the aileron clamp arms 154*a* and 154*b* also support mounting screws with coil springs (not shown in FIGS. 23A and 23B) that hold up a respective polymeric gripping pad 156 (e.g., made of polyurethane) and a respective pressure plate 158. When the thumbscrews 11*a* and 11*b* are tightened, the pressure plate 158 presses the polymeric gripping pad 156 into contact with the bottom surface of the fixed trailing edge of the wing. At the same time, the aileron clamp block 152 (also made of polymeric material) presses against the top surface of the fixed trailing edge of the wing. Since the clamp surfaces that contact the trailing edge of the wing are made of polymeric material, damage to the wing surface is avoided. In an alternative implementation of the inboard clamp arm, the pressure plate 158 and polymeric gripping pad 156 are omitted in favor of polymeric tips installed to the ends of the thumbscrews 11*a* and 11*b*.

The aileron clamp 4*a* depicted in FIGS. 23A and 23B further includes a mounting girder 157 which is fixedly coupled to the aileron clamp block 152. A pair of anchor brackets 159*a* and 159*b* are attached to opposing ends of the mounting girder 157. In addition, an RFID puck 155 is attached to the mounting girder 157, occupying a position between the anchor bracket 159*b* and the aileron clamp block 152. The RFID puck 155 has an RFID tag (not shown in FIGS. 23A and 23B, but see FIG. 5) attached thereto. Typically, the RFID tag is a thin disk that is glued into place. For the example depicted in FIGS. 23A and 23B, the RFID tag would contain information that identifies a left-hand aileron clamp.

A sensor module 2 is anchored to the anchor brackets 159*a* and 159*b* by means of a pair of draw latches 160*a* and 160*b*. One end of draw latch 160*a* is pivotably coupled to anchor bracket 159*a*; one end of draw latch 160*b* is pivotably coupled to anchor bracket 159*b*. The latches 160*a* and 160*b* latch onto the catches 33*a* and 33*b* (seen in FIG. 8) to secure the sensor module 2 to the aileron clamp 4*a*. The aileron clamp block 152 has sensor alignment geometry 166*a* and 166*b* affixed thereto which protrudes from the top surface and engages in corresponding recesses in the base of the sensor module 2, which engagement ensures that the sensor module 2 is correctly located relative to the measurement surface.

Figure 24:
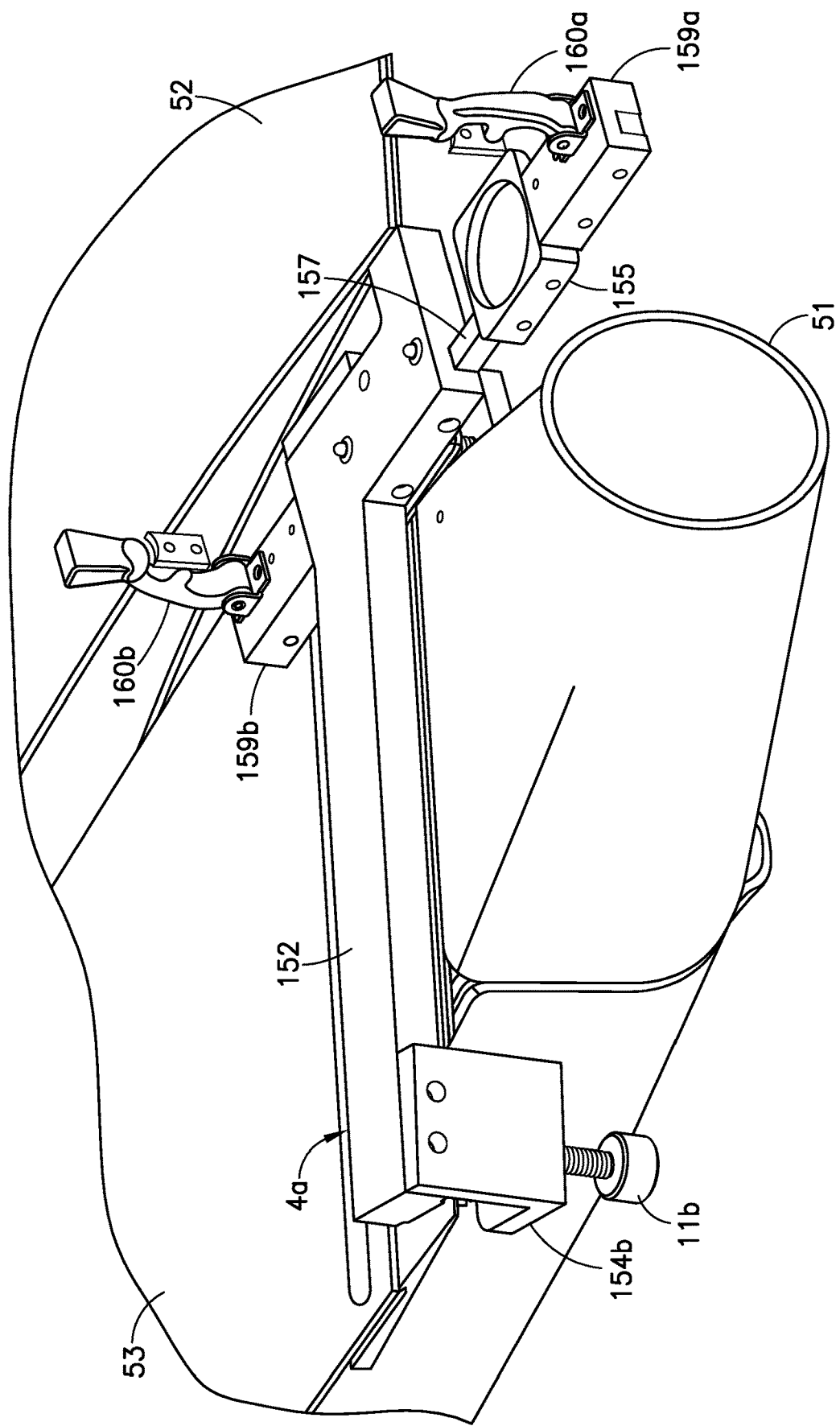
FIG. 24 is a diagram representing a three-dimensional view of a right-hand (RH) aileron clamp installed (without a sensor module) on a fixed trailing edge of a right-hand wing of an aircraft.

In one implementation, two aileron clamps interface with the fixed trailing edge of each wing in the area surrounding the fuel jettison boom. FIG. 24 is a diagram representing a three-dimensional view of an aileron clamp 4*a* installed (without a sensor module) on a fixed trailing edge 23 of a right-hand wing of an aircraft in the area surrounding a fuel jettison boom 51.

Figure 25:
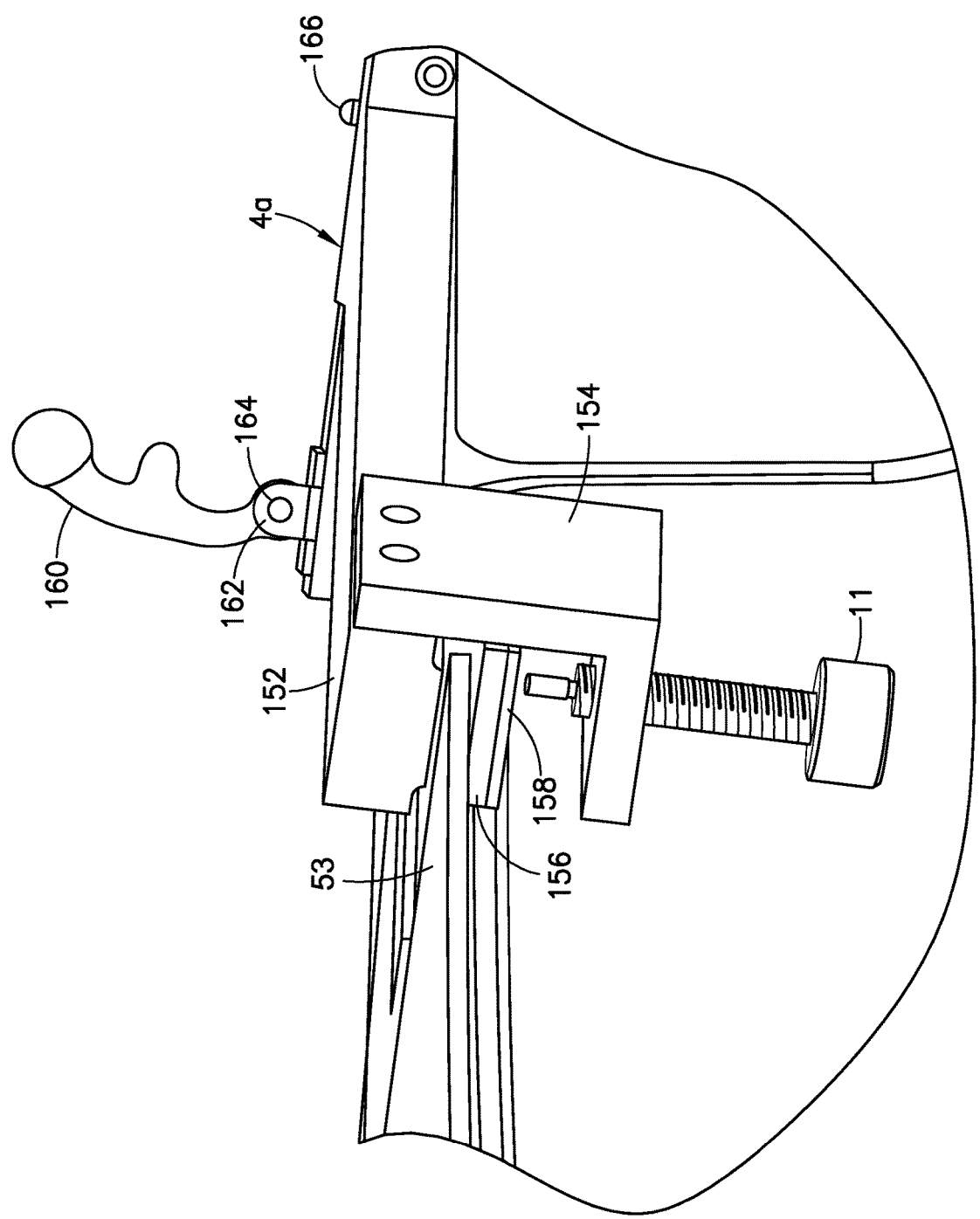
FIG. 25 is a diagram representing a three-dimensional view of some components of an aileron clamp assembly for installation in the embodiment depicted in FIG. 22.

FIG. 25 is a diagram representing a three-dimensional view of a portion of an aileron clamp 4*a* in the process of being installed. When the thumbscrew is fully tightened, a portion of the trailing edge 53 of the wing is clamped between the polymeric aileron clamp block 152 and the polymeric gripping pad 156 to provide a non-marring grip of the painted surfaces of the trailing edge 53 of the wing. As seen in FIG. 25, one end of the draw latch 160 is pivotably coupled to an axle 164 that is supported at opposite ends by a clevis 162. The clevis 162 in turn is attached to an anchor bracket (such as anchor brackets 159a and 159b depicted in FIG. 23A).

Figure 26:
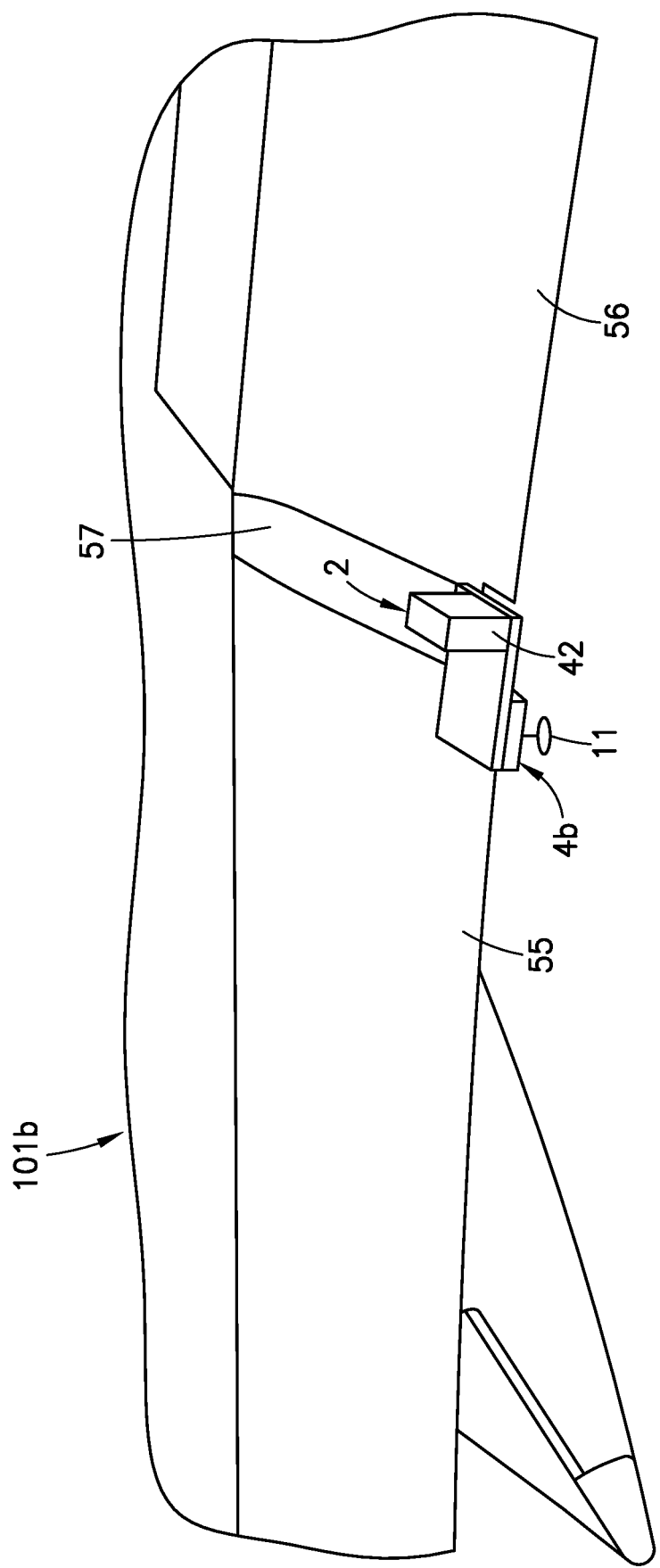
FIG. 26 is a diagram representing a three-dimensional view of a remote optical control surface indication system configured (in a laser mode) and installed for measuring a position of a flaperon relative to a flap in accordance with a further embodiment.

In accordance with an additional implementation, sensor modules may be installed for use in rigging the left and right flaperons 56a and 56b seen in FIG. 11. FIG. 26 is a diagram representing a three-dimensional view of a remote optical control surface indication system configured (in a laser mode) and installed for measuring a position of a flaperon 56 relative to an inboard flap 55. A sensor module 2 is latched to a flaperon clamp 4b, which is in turn clamped to the outboard edge of the inboard flap 55 by a pair of thumbscrews 11 (only one thumbscrew is shown in FIG. 26). In this implementation, the flaperon clamp 4b bridges a frangible flap panel 57.

Figure 27A:
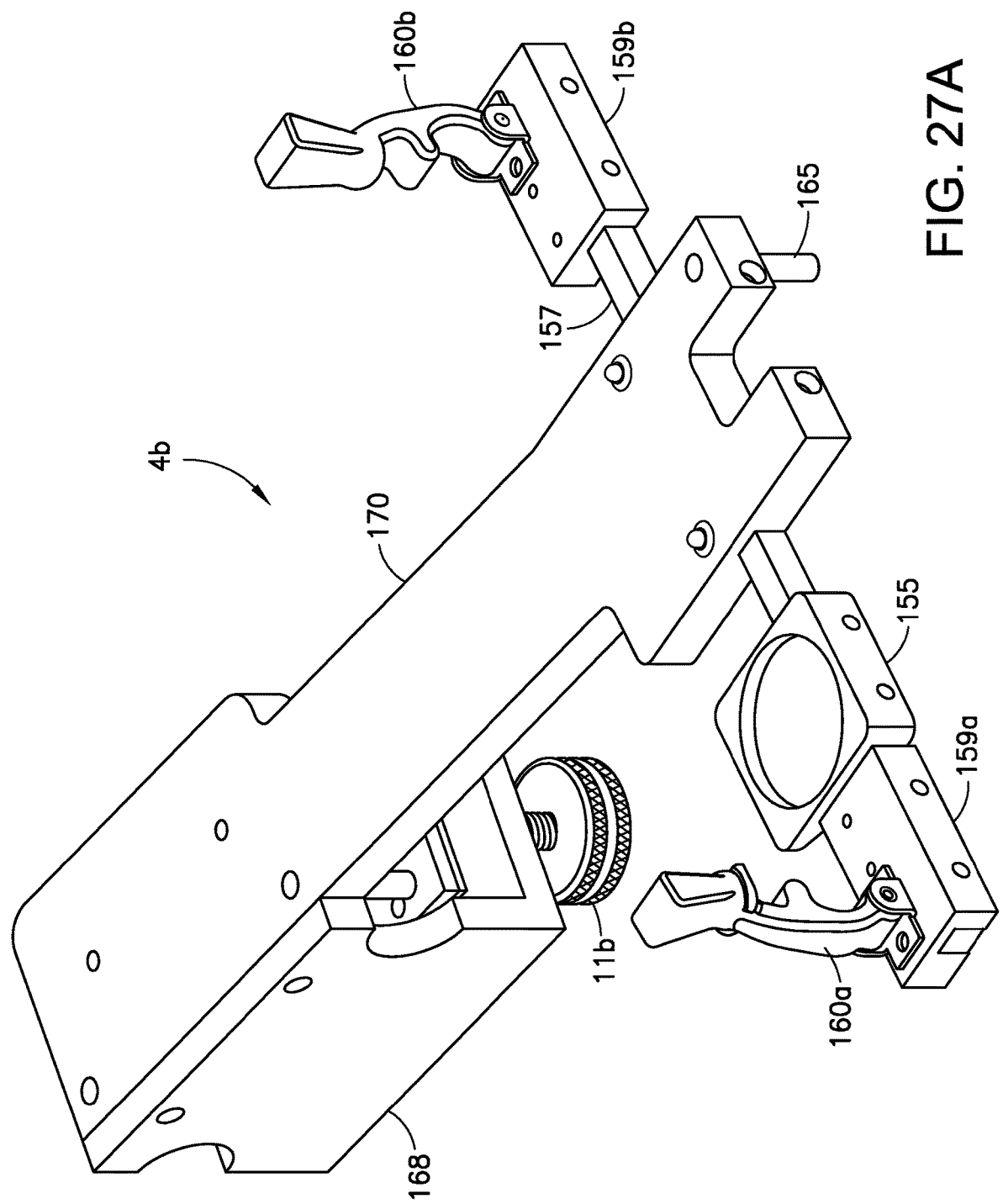
FIGS. 27A and 27B are diagrams representing top and bottom three-dimensional views respectively of a right-hand (RH) flaperon clamp in accordance with one proposed implementation.
Figure 27B:
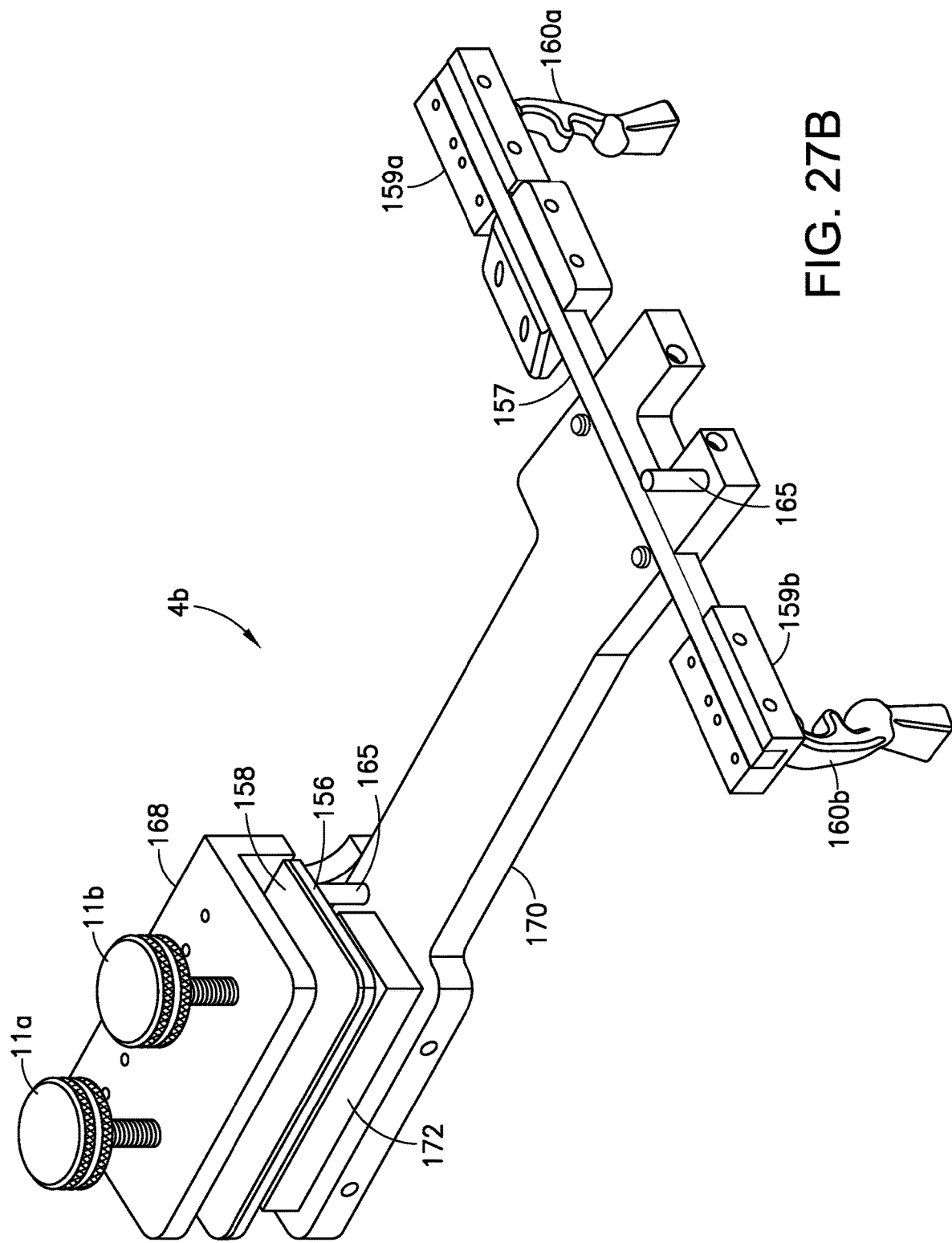

FIGS. 27A and 27B are diagrams representing top and bottom three-dimensional views respectively of a flaperon clamp 4b in accordance with one proposed implementation. This view shows a right-hand flaperon clamp, but the left-hand flaperon clamp is a mirror image of the right-hand flaperon clamp shown in FIGS. 27A and 27B. In either case, the flaperon clamp 4b is an assembly that includes a flaperon clamp block 170 and a flaperon clamp arm 168 which is rigidly coupled to the flaperon clamp block 170. The flaperon clamp arm 168 and flaperon clamp block 170 are made of metal. for example, aluminum. A flaperon clamp contact pad 172 (visible in FIG. 27B) is attached to the flaperon clamp block 170. The flaperon clamp contact pad 172 is made of polymeric material, for example, DuPont™ Delrin® acetal resin.

The flaperon clamp arm 168 has a pair of threaded bores which threadably engage the threaded shafts of respective thumbscrews 11a and 11b. The flaperon clamp arm 168 also supports mounting screws with coil springs (not shown in FIGS. 27A and 27B) that hold up a respective polymeric gripping pad 156 (e.g., made of polyurethane) and a respective pressure plate 158. When the thumbscrews 11a and 11b are tightened, the pressure plate 158 presses the polymeric gripping pad 156 into contact with the bottom surface of the flap 55. At the same time, the flaperon clamp contact pad 172 (also made of polymeric material) presses against the top surface of the flap 55. Since the clamp surfaces that contact the flap 55 are made of polymeric material, damage to the flap surface is avoided. The flaperon clamp 4b depicted in FIGS. 27A and 27B further includes a mounting girder 157 which is fixedly coupled to the flaperon clamp block 170. A pair of anchor brackets 159a and 159b are attached to opposing ends of the mounting girder 157. In addition, an RFID puck 155 is attached to the mounting girder 157, occupying a position between the anchor bracket 159a and the flaperon clamp block 170. The RFID puck 155 has an RFID tag (not shown in FIGS. 27A and 27B) attached thereto. For the example depicted in FIGS. 27A and 27B, the RFID tag would contain information that identifies a right-hand flaperon clamp.

A sensor module 2 is anchored to the anchor brackets 159a and 159b by means of a pair of draw latches 160a and 160b as previously described. The latches 160a and 160b latch onto the catches 33a and 33b (seen in FIG. 8) to secure the sensor module 2 to the flaperon clamp 4b. The flaperon clamp block 170 has sensor alignment geometry 166a and 166b affixed thereto which protrudes from the top surface and engages in corresponding recesses in the base of the sensor module 2, which engagement ensures that the sensor module 2 is correctly located relative to the measurement surface.

FIG. 28 is a diagram representing a three-dimensional view of some components of a flaperon clamp 4b installed on an inboard flap 55. When the thumbscrews 11a and 11b are fully tightened, an aft outboard corner of the inboard flap 55 is clamped between the polymeric flaperon clamp contact pad 172 and the polymeric gripping pad 156 to provide a non-marring grip of the painted surfaces of the inboard flap 55. The flaperon clamp contact pad 172 is machined down to a specific thickness after it is mounted to the flaperon clamp block 170 to maintain the sensor mounting height of ½" above the measurement surface at the optimal rigging zero position. The reason the flaperon clamp block 170 is made of aluminum in this case is because the flaperon clamp block 170 needs to reach over the frangible flap panel 57 where nothing should be mounted, and therefore it needs to be stiff and not sag over its length.

As seen in FIG. 28, one end of the draw latch 160 is pivotably coupled to an axle 164 that is supported at opposite ends by a clevis 162. The clevis 162 in turn is attached to an anchor bracket (such as anchor brackets 159a and 159b depicted in FIG. 27A). The other end of the draw latch 160 couples with a catch (not visible in FIG. 28) to hold the sensor module 2 in proper position in relation to the adjacent flaperon 56.

Figure 29:
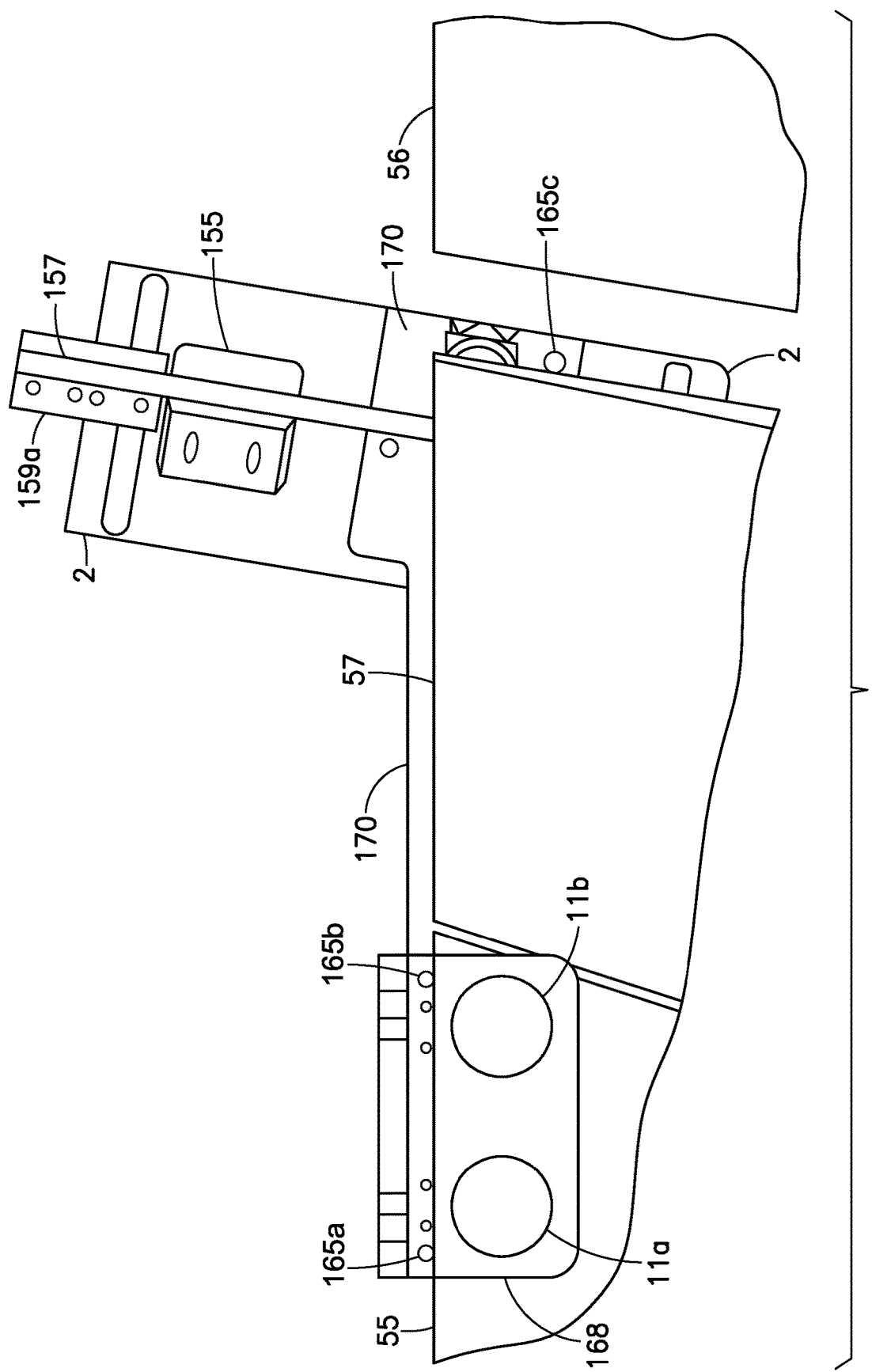
FIG. 29 is a diagram representing a bottom view of the indexing of an RH flaperon clamp (with a sensor module) clamped to the outboard edge of an inboard flap in accordance with another proposed implementation.

The flaperon clamp 4b is properly placed on the inboard flap 55 with the aid of three indexing pins 165, only two of which are visible in FIG. 28. FIG. 29 is a diagram representing a bottom view of the indexing of a right-hand flaperon clamp 4b (with a sensor module 2) clamped to the outboard corner of an inboard flap 55. As shown in FIG. 29, two alignment pins 165a and 165b must contact the trailing edge of the inboard flap 55, while a third alignment pin 165c contacts the outboard edge of the frangible flap panel 57. Before tightening the two thumbscrews 11a and 11b, the flaperon clamp 4b is pushed onto the flap assembly until all three of the indexing pins 165a-165c are making contact with the aircraft skin. Then the thumbscrews 11a and 11b are hand-tightened, making sure that the indexing pins are still making contact.

During the flaperon rigging procedure, the inboard flap 55 is fully retracted and rigged (mechanically set) to its precise zero-degree position. This is a prerequisite to the rigging of the flaperons, since the flaperons are rigged to a certain position in relation to the inboard flap trailing edge. However, the clamp and sensor may be attached to the flap at any time without interfering with the flap rigging process.

Figure 30:
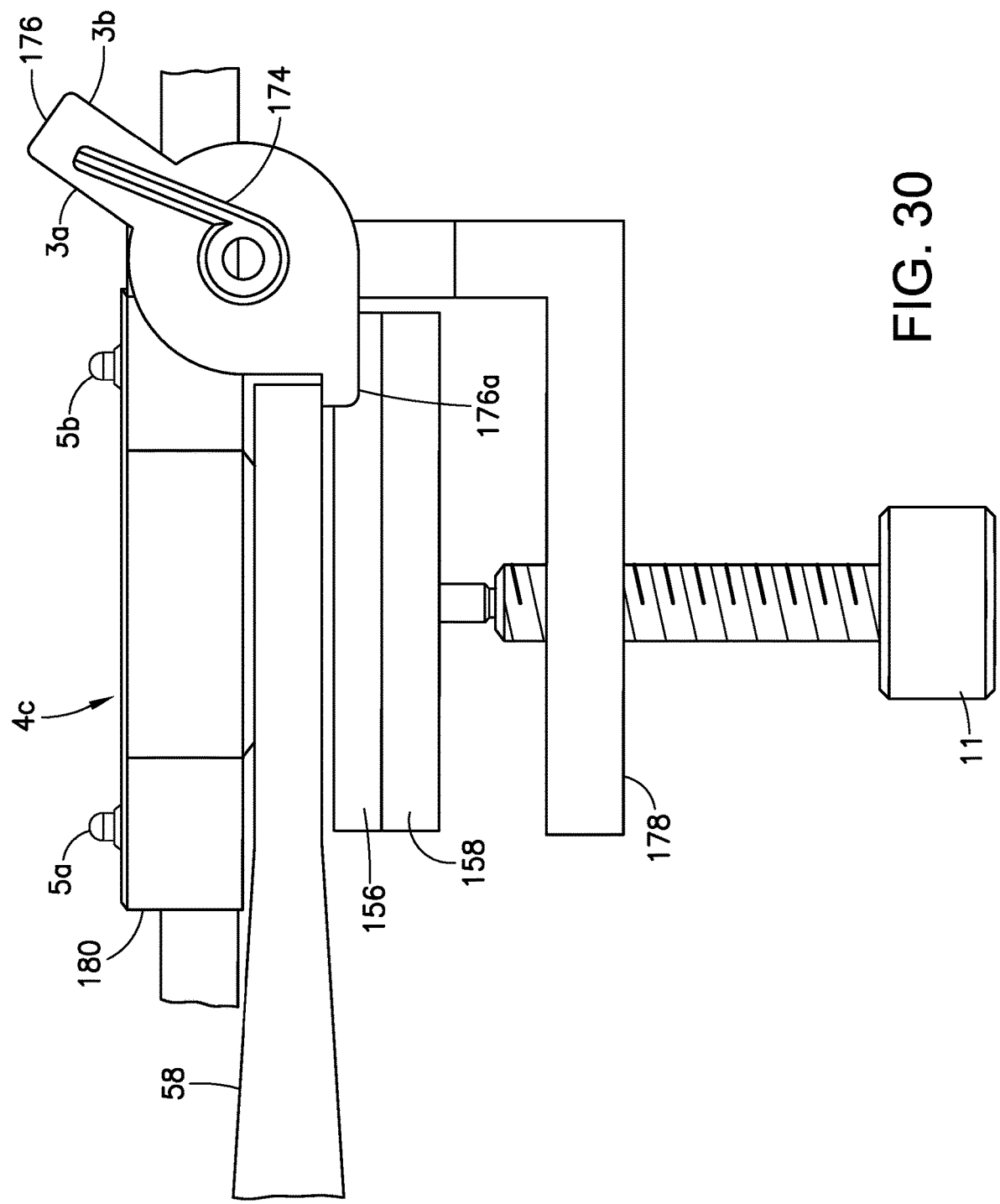
FIG. 30 is a diagram representing an end view of an elevator clamp installed (without a sensor module) on a trailing edge of an elevator. The elevator clamp features an indicator flag to ensure the clamp has not been moved subsequent to installation.

In accordance with some implementations, some or all of the clamp arms are equipped with indicator flags to ensure that the clamp has not been moved by accident subsequent to installation. FIG. 30 is a diagram representing an end view of an elevator clamp 4c installed (without a sensor module) on a trailing edge of an elevator 58. The elevator clamp 4c features an indicator flag 176 that has a red surface 3a and a green surface 3b. When the elevator clamp 4c is properly installed on the trailing edge of the elevator 58, a catch feature 176a latches underneath that trailing edge and the green surface 3b is visible from a vantage point aft of the trailing edge of the elevator 58. However, if the elevator clamp 4c is moved in a manner that causes the catch feature 176a to unlatch from the trailing edge of the elevator 58, a spring 174 applies a torque that causes the indicator flag to rotate clockwise in the view seen in FIG. 30. As a result of this rotation, the green surface 3b is no longer visible from the aforementioned viewpoint and instead the red surface 3a is visible. This provides a visual alert that the installation of the elevator clamp 4c should be checked before starting the elevator rigging procedure.

One embodiment of a method for optically measuring a position of a measurement surface relative to a reference position using a battery-powered sensor module includes the following steps. A first clamp is attached to a first reference surface at a first location, wherein the first clamp has a first structure designed to clamp onto the first reference surface at the first location. Before or after the first clamp is attached, a first sensor module is fixedly coupled to the first clamp so that a first laser device inside the first sensor module is aimed at a first measurement surface. One of the first measurement surface and first reference surface is movable relative to the other. Electric power from a first battery incorporated in the first sensor module is supplied while the first sensor module is in a sleep mode at the first location. Then a second clamp is attached to a second reference surface at a second location, wherein the second clamp has a second structure designed to clamp onto the second reference surface at the second location. Before or after the second clamp is attached, a second sensor module is fixedly coupled to the second clamp so that a second laser device inside the second sensor module is aimed at a second measurement surface. One of the second measurement surface and second reference surface is movable relative to the other. Electric power from a second battery incorporated in the second sensor module is supplied while the second sensor module is in a sleep mode at the second location.

Following installation of the first and second sensor modules, the respective positions of the first and second measurement surfaces may be measured at different times. In accordance with one embodiment of the method, the mode of the first sensor module is wirelessly changed from a sleep mode to an active mode at a first time. The second sensor module is in the sleep mode at the first time. Then the first sensor module in the active mode is wirelessly activated to project a curtain of light onto the first measurement surface along a first impingement line using the first laser device and detect a first object centroid where light scattered from the first impingement line impinges on a first row of photodetectors of the first sensor module. The first object centroid data signals are wirelessly transmitted from the first sensor module to a data acquisition module (e.g., data acquisition computer 62). The first object centroid data signals represent a measured position of the first measurement surface at the first time.

Thereafter the mode of the second sensor module is wirelessly changed from a sleep mode to an active mode at a second time. In the interim between the first and second times, the first sensor module is wirelessly changed from the active mode to the sleep mode. Thus the first sensor module is in the sleep mode at the second time. Then the second sensor module in the active mode is wirelessly activated to project a curtain of light onto the second measurement surface along a second impingement line using the second laser device and detect a second object centroid where light scattered from the second impingement line impinges on a second row of photodetectors of the second sensor module. The second object centroid data signals are wirelessly transmitted from the second sensor module to the data acquisition module. The second object centroid data signals represent a measured position of the second measurement surface at the second time.

The data acquisition module converts the first object centroid data signals to a first distance measurement using first stored data representing a table or an equation that correlates pixel values with measured distances in a manner that is characteristic of movement of the first measurement surface. Likewise data acquisition module converts the second object centroid data signals to a second distance measurement using second stored data representing a table or an equation that correlates pixel values with measured distances in a manner that is characteristic of movement of the second measurement surface.

The procedure described in the immediately preceding four paragraphs may be extrapolated to include the installation of more than two sensor modules on a structure. For example, a multiplicity of sensor modules 2 may be installed on an aircraft at the locations indicated in FIG. 12 and employed in the rigging of the ailerons, flaperons, elevators, rudder and other control surfaces of the aircraft.

While systems and methods for optically measuring a position of a measurement surface relative to a reference position have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The embodiments disclosed above use one or more computing systems. As used herein, the term "computing system" comprises one or more of the following: a computer, a processor, a controller, a central processing unit, a microcontroller, a reduced instruction set computer processor, an ASIC, a programmable logic circuit, an FPGA, a digital signal processor, and/or any other circuit or processing device capable of executing the functions described herein. For example, a computing system may comprise multiple microcontrollers or multiple processors which communicate via interfaces.

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

As used herein, the term "location" comprises position in a fixed three-dimensional coordinate system and orientation relative to that coordinate system. As used in the claims, the term "support member" should be construed broadly to encompass a plunger boss and structural equivalents thereof.

The structure corresponding to the "means for identifying the clamp" recited in the claims includes an RFID tag, physical features recognizable by a microswitch array, and structural equivalents thereof.

The invention claimed is:

1. An apparatus comprising a clamp and a sensor module latched to the clamp, wherein the sensor module comprises a housing and first and second catches disposed on opposite sides of the housing, and the clamp comprises:
   a clamp block;
   a mounting girder attached to the clamp block and comprising first and second ends;
   first and second anchor brackets respectively attached to the first and second ends of the mounting girder;

first and second latches pivotably coupled to the first and second anchor brackets respectively clamp block and latched to the first and second catches to hold the sensor module flush against the clamp block;
first and second indexing pins projecting from the clamp block;
a clamp arm attached to the clamp block and having a portion with first and second threaded bores; and
first and second screws threadably coupled to the first and second threaded bores respectively.

2. The apparatus as recited in claim 1, wherein the clamp further comprises:
a pressure plate movably coupled to the clamp arm and disposed between the clamp block and a portion of the clamp arm; and
a contact pad attached to the clamp block and disposed between the clamp block and the pressure plate, wherein the contact pad is made of polymeric material.

3. The apparatus as recited in claim 1, wherein the clamp comprises means for identifying the clamp and the sensor module comprises means for detecting an identity of the clamp.

4. The apparatus as recited in claim 3, wherein the means for identifying the clamp comprises an RFID tag and the means for detecting the identity of the clamp comprises an RFID reader.

5. The apparatus as recited in claim 3, wherein the means for identifying the clamp comprises a plurality of physical features at respective positions on the clamp block, and the means for detecting the identity of the clamp comprises a plurality of switches which are aligned with the respective positions on the clamp block.

6. The apparatus as recited in claim 1, wherein the sensor module further comprises:
a battery;
a laser device mounted inside the housing and configured to project a curtain of light in a first plane, wherein the laser device receives electric power from the battery;
a row of photodetectors arranged in sequence along a straight line inside the housing and configured to output respective analog photodetector output signals in response to impingement of light; and
a lens mounted inside the housing in front of the row of photodetectors and having a focal axis and having a field of view that intersects the curtain of light projected by the laser device.

7. The apparatus as recited in claim 6, wherein the focal axis of the lens and the straight line of the row of photodetectors lie in a second plane that is perpendicular to the first plane.

8. The apparatus as recited in claim 6, wherein the sensor module further comprises a microcontroller that is configured to control operation of the laser device and compute a location of an object centroid relative to the row of photodetectors based on the analog photodetector output signals output by the row of photodetectors.

9. The apparatus as recited in claim 8, wherein the sensor module further comprises a transceiver configured to transmit a radio-frequency signal carrying object centroid data representing the location of the object centroid computed by the microcontroller.

10. The apparatus as recited in claim 9, wherein the microcontroller and the transceiver receive electric power from the battery.

11. An apparatus comprising a clamp and a sensor module latched to the clamp, wherein the sensor module comprises a housing and first and second catches disposed on opposite sides of the housing, and the clamp comprises:
a clamp block;
a mounting girder attached to the clamp block and comprising first and second ends;
first and second anchor brackets respectively attached to the first and second ends of the mounting girder;
first and second latches pivotably coupled to the first and second anchor brackets respectively and latched to the first and second catches to hold the sensor module flush against the clamp block;
first and second indexing pins projecting from the clamp block;
a first clamp arm attached to the clamp block and having a first threaded bore;
a second clamp arm attached to the clamp block and having a second threaded bore; and
first and second screws threadably coupled to the first and second threaded bores respectively.

12. The apparatus as recited in claim 11, wherein the clamp further comprises:
a first pressure plate movably coupled to the first clamp arm and disposed between the clamp block and a portion of the first clamp arm;
a first contact pad attached to the clamp block and disposed between the clamp block and the first pressure plate;
a second pressure plate movably coupled to the second clamp arm and disposed between the clamp block and a portion of the second clamp arm; and
a second contact pad attached to the clamp block and disposed between the clamp block and the second pressure plate,
wherein the first and second contact pads are made of polymeric material.

13. The apparatus as recited in claim 11, wherein the clamp comprises means for identifying the clamp and the sensor module comprises means for detecting an identity of the clamp.

14. The apparatus as recited in claim 13, wherein the means for identifying the clamp comprises an RFID tag and the means for detecting the identity of the clamp comprises an RFID reader.

15. The apparatus as recited in claim 13, wherein the means for identifying the clamp comprises a plurality of physical features at respective positions on the clamp block, and the means for detecting the identity of the clamp comprises a plurality of switches which are aligned with the respective positions on the clamp block.

16. The apparatus as recited in claim 11, wherein the sensor module further comprises:
a battery;
a laser device mounted inside the housing and configured to project a curtain of light in a first plane, wherein the laser device receives electric power from the battery;
a row of photodetectors arranged in sequence along a straight line inside the housing and configured to output respective analog photodetector output signals in response to impingement of light; and
a lens mounted inside the housing in front of the row of photodetectors and having a focal axis and having a field of view that intersects the curtain of light projected by the laser device.

17. The apparatus as recited in claim 16, wherein the focal axis of the lens and the straight line of the row of photodetectors lie in a second plane that is perpendicular to the first plane.

18. The apparatus as recited in claim 11, wherein the clamp comprises means for identifying the clamp and the sensor module comprises means for detecting an identity of the clamp.

19. An apparatus comprising a clamp and a sensor module latched to the clamp, wherein the sensor module comprises a housing and first and second catches disposed on opposite sides of the housing, and the clamp comprises:
- a clamp block;
- a mounting girder attached to the clamp block and comprising first and second ends;
- first and second anchor brackets respectively attached to the first and second ends of the mounting girder;
- first and second latches pivotably coupled to the first and second anchor brackets respectively clamp block and latched to the first and second catches to hold the sensor module flush against the clamp block;
- first and second indexing pins projecting from the clamp block;
- at least one clamp arm attached to the clamp block and comprising a first clamp arm portion having a first threaded bore and a second clamp arm portion having a second threaded bore; and
- first and second thumbscrews threadably coupled to the first and second threaded bores respectively.

20. The apparatus as recited in claim 19, wherein the clamp further comprises:
- a first pressure plate movably coupled to the first clamp arm and disposed between the clamp block and a portion of the first clamp arm;
- a first contact pad attached to the clamp block and disposed between the clamp block and the first pressure plate;
- a second pressure plate movably coupled to the second clamp arm and disposed between the clamp block and a portion of the second clamp arm; and
- a second contact pad attached to the clamp block and disposed between the clamp block and the second pressure plate,
wherein the first and second contact pads are made of polymeric material.

\* \* \* \* \*